US008224518B2

(12) United States Patent
Cameron

(10) Patent No.: US 8,224,518 B2
(45) Date of Patent: Jul. 17, 2012

(54) AUTOMATED RECORDATION OF CRANE INSPECTION ACTIVITY

(75) Inventor: John F. Cameron, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 566 days.

(21) Appl. No.: 12/411,064

(22) Filed: Mar. 25, 2009

(65) Prior Publication Data

US 2010/0039319 A1 Feb. 18, 2010

Related U.S. Application Data

(63) Continuation-in-part of application No. 12/193,171, filed on Aug. 18, 2008.

(51) Int. Cl.
*G01M 17/00* (2006.01)

(52) U.S. Cl. ......................... 701/31.5; 701/32.3; 701/50

(58) Field of Classification Search .................... 701/50, 701/29, 33, 35, 29.1–34.4; 340/685; 212/276, 212/278; 455/41.1, 41.2
See application file for complete search history.

(56) References Cited

U.S. PATENT DOCUMENTS

| | | | | |
|---|---|---|---|---|
| 3,796,322 | A | 3/1974 | Cording | |
| 4,178,591 | A * | 12/1979 | Geppert | 340/685 |
| 4,752,012 | A | 6/1988 | Juergens | |
| 4,857,753 | A | 8/1989 | Mewburn-Crook et al. | |
| 5,095,531 | A | 3/1992 | Ito | |
| 5,224,388 | A | 7/1993 | Pratt | |
| 5,359,542 | A | 10/1994 | Pahmeier et al. | |
| 5,381,136 | A | 1/1995 | Powers et al. | |
| 5,491,486 | A | 2/1996 | Welles, II | |
| 5,634,565 | A | 6/1997 | Lesage | |
| 5,640,452 | A | 6/1997 | Murphy | |
| 5,650,770 | A | 7/1997 | Schlager et al. | |
| 5,752,197 | A | 5/1998 | Rautiola | |
| 5,859,839 | A | 1/1999 | Ahlenius et al. | |
| 5,883,817 | A | 3/1999 | Chisholm et al. | |
| 5,890,091 | A | 3/1999 | Talbot et al. | |
| 5,917,405 | A | 6/1999 | Joao | |
| 5,987,379 | A | 11/1999 | Smith | |
| 6,016,117 | A | 1/2000 | Nelson, Jr. | |
| 6,046,687 | A | 4/2000 | Janky | |
| 6,052,925 | A | 4/2000 | Reiners | |

(Continued)

FOREIGN PATENT DOCUMENTS

| | | |
|---|---|---|
| GB | 2373086 | 9/2002 |
| JP | 05286692 | 11/1993 |
| JP | 8240653 | 9/1996 |
| JP | 2000/048283 | 2/2000 |
| JP | 2000/249752 | 9/2000 |
| JP | 2002/197593 | 7/2002 |
| JP | 2002/197595 | 7/2002 |

(Continued)

OTHER PUBLICATIONS

"Tower Cranes Anti-Collision and Zone Protection System", www.tac3000.com, (2004),36.

(Continued)

*Primary Examiner* — Darnell Jayne
*Assistant Examiner* — Patrick Hawn

(57) ABSTRACT

In a method for creating a record of crane inspection activity, a wireless inspection communication between a component monitor and a component information unit is initiated in response to a crane inspection activity. The component information unit is mechanically coupled with a crane component. An inspection record related to the crane component is automatically storing within the component monitor. The inspection record includes a geostamp and a timestamp associated with the inspection communication. The geostamp and timestamp are stored in the inspection record in conjunction with a component identification that is associated the crane component and that is received from the component information unit as part of the wireless inspection communication.

9 Claims, 19 Drawing Sheets

U.S. PATENT DOCUMENTS 6,064,335 A 5/2000 Eschenbach
6,067,031 A 5/2000 Janky et al.
6,076,030 A 6/2000 Rowe
6,118,196 A 9/2000 Cheng-Yon
6,124,825 A 9/2000 Eschenbach
6,144,307 A 11/2000 Elliot
6,166,688 A 12/2000 Cromer et al.
6,243,648 B1 6/2001 Kilfeather et al.
6,268,804 B1 7/2001 Janky et al.
6,297,744 B1 10/2001 Baillargeon et al.
6,301,616 B1 10/2001 Pal et al.
6,317,500 B1 11/2001 Murphy
6,320,273 B1 11/2001 Nemec
6,330,149 B1 12/2001 Burrell
6,356,196 B1 3/2002 Wong et al.
6,362,736 B1 3/2002 Gehlot
6,377,165 B1 4/2002 Yoshioka et al.
6,439,515 B1 8/2002 Powers
6,453,237 B1 9/2002 Fuchs et al.
6,459,988 B1 10/2002 Fan et al.
6,480,788 B2 11/2002 Kilfeather et al.
6,496,766 B1 * 12/2002 Bernold et al. ................. 701/50
6,501,421 B1 12/2002 Dutta
6,505,049 B1 1/2003 Dorenbosch
6,512,465 B2 1/2003 Flick
6,539,307 B1 3/2003 Holden et al.
6,560,536 B1 5/2003 Sullivan et al.
6,609,064 B1 8/2003 Dean
6,650,242 B2 11/2003 Clerk et al.
6,651,000 B2 11/2003 van Diggelen et al.
6,657,587 B1 12/2003 Mohan
6,658,336 B2 12/2003 Browne et al.
6,658,349 B2 12/2003 Cline
6,675,095 B1 1/2004 Bird et al.
6,677,938 B1 1/2004 Maynard
6,700,533 B1 3/2004 Werb et al.
6,700,762 B2 3/2004 Underwood et al.
6,725,158 B1 4/2004 Sullivan et al.
6,801,853 B2 10/2004 Workman
6,804,602 B2 10/2004 Impson et al.
6,826,452 B1 11/2004 Holland et al.
6,829,535 B2 12/2004 van Diggelen et al.
6,843,383 B2 1/2005 Schneider et al.
6,864,789 B2 3/2005 Wolfe
6,865,169 B1 3/2005 Quayle et al.
6,934,629 B1 8/2005 Chisholm et al.
6,970,801 B2 11/2005 Mann
6,975,941 B1 12/2005 Lau et al.
6,981,423 B1 1/2006 Discenzo
7,020,555 B1 3/2006 Janky et al.
7,031,883 B1 4/2006 Lee
7,032,763 B1 4/2006 Zakula, Sr. et al.
7,034,683 B2 4/2006 Ghazarian
7,050,907 B1 5/2006 Janky et al.
7,070,060 B1 7/2006 Feider et al.
7,095,368 B1 8/2006 van Diggelen
7,095,370 B1 8/2006 van Diggelen et al.
7,135,976 B2 11/2006 Neff et al.
7,158,883 B2 1/2007 Fuchs et al.
7,212,120 B2 5/2007 Gudat
7,289,875 B2 10/2007 Recktenwald et al.
7,295,855 B1 11/2007 Larsson et al.
7,298,319 B2 11/2007 Han et al.
7,308,114 B2 12/2007 Takehara et al.
7,313,476 B2 12/2007 Nichols et al.
7,324,921 B2 1/2008 Sugahara et al.
7,344,037 B1 3/2008 Zakula et al.
7,367,464 B1 5/2008 Agostini et al.
7,398,153 B2 7/2008 Workman et al.
7,486,174 B2 2/2009 Battista et al.
7,493,112 B2 * 2/2009 Adachi et al. ................. 455/420
7,548,200 B2 6/2009 Garin
7,548,816 B2 6/2009 Riben et al.
7,574,300 B2 8/2009 Twitchell et al.
7,633,389 B2 12/2009 Mantovani et al.
7,639,181 B2 12/2009 Wang et al.
7,667,642 B1 2/2010 Fericks et al.
7,710,317 B2 5/2010 Cheng et al.
7,719,416 B2 5/2010 Arms et al.
7,725,158 B2 5/2010 Rezzonico et al.
7,868,755 B2 1/2011 Hanai et al.
2002/0070856 A1 6/2002 Wolfe
2002/0082036 A1 6/2002 Ida et al.
2002/0117609 A1 8/2002 Thibault et al.
2002/0142788 A1 10/2002 Chawla et al.
2002/0196151 A1 12/2002 Troxler
2003/0045314 A1 3/2003 Burgan et al.
2003/0064744 A1 4/2003 Zhang et al.
2003/0073435 A1 4/2003 Thompson et al.
2003/0119445 A1 6/2003 Bromham et al.
2004/0024522 A1 2/2004 Walker et al.
2004/0034470 A1 2/2004 Workman
2004/0044911 A1 3/2004 Takada et al.
2004/0148083 A1 * 7/2004 Arakawa et al. ................ 701/50
2004/0196182 A1 * 10/2004 Unnold .................... 342/357.07
2004/0219927 A1 11/2004 Sumner
2004/0243285 A1 12/2004 Gounder
2005/0021245 A1 1/2005 Furuno et al.
2005/0030175 A1 2/2005 Wolfe
2005/0055161 A1 3/2005 Kalis et al.
2005/0095985 A1 5/2005 Hafeoz
2005/0103738 A1 5/2005 Recktenwald et al.
2005/0116105 A1 6/2005 Munk et al.
2005/0137742 A1 6/2005 Goodman et al.
2005/0147062 A1 7/2005 Khouaja et al.
2005/0154904 A1 7/2005 Perepa et al.
2005/0179541 A1 8/2005 Wolfe
2005/0195101 A1 9/2005 Stevens et al.
2005/0237154 A1 10/2005 Kafry
2005/0242052 A1 11/2005 O'Connor et al.
2006/0027677 A1 * 2/2006 Abts .............................. 239/67
2006/0145863 A1 7/2006 Martin et al.
2006/0181452 A1 8/2006 King et al.
2006/0238309 A1 10/2006 Takatama
2006/0243056 A1 * 11/2006 Sundermeyer et al. ......... 73/760
2007/0005244 A1 1/2007 Nadkarni
2007/0202861 A1 * 8/2007 Adachi et al. .............. 455/414.2
2007/0255498 A1 11/2007 McDaniel et al.
2008/0014965 A1 1/2008 Dennison et al.
2008/0036617 A1 2/2008 Arms et al.
2008/0040244 A1 2/2008 Ricciuti et al.
2008/0061959 A1 3/2008 Breed
2008/0084332 A1 * 4/2008 Ritter et al. ................... 340/989
2008/0100977 A1 5/2008 Shreiner et al.
2008/0122234 A1 5/2008 Alioto et al.
2008/0221836 A1 9/2008 Tateson
2008/0221943 A1 9/2008 Porter et al.
2008/0238657 A1 10/2008 Hupp et al.
2009/0009389 A1 1/2009 Mattos
2009/0109049 A1 4/2009 Frederick et al.
2009/0134997 A1 5/2009 Godlewski
2009/0189784 A1 7/2009 Lindgren
2009/0195356 A1 8/2009 Tuttle
2010/0100338 A1 4/2010 Vik et al.
2010/0121504 A1 5/2010 Jones et al.
2010/0127927 A1 5/2010 Rousset

FOREIGN PATENT DOCUMENTS

JP 2002/217811 8/2002
WO WO-00/68907 11/2000
WO WO-02/35492 5/2002
WO WO-03/007261 1/2003
WO WO-2004/017272 2/2004
WO WO-2004/083888 9/2004
WO WO-2005/017846 2/2005
WO WO-2009/084820 7/2009

OTHER PUBLICATIONS

"Anti-Collision Systems a Clash of Cultures", http://www.cranestodaymagazine.com/story.asp?sectionCode=66&storyCode=2043070 (Mar. 21, 2007),6.

Abderrahim, M. et al., "A Mechatronics Security System for the Construction Site", www. elsevier.com/locate/autcon, (Sep. 7, 2004),460-466.

"Highland Man's Invention Success With Dewalt", http://www.heraldextra.com/content/view/195674/4/, (Oct. 8, 2006),3.

* cited by examiner

AUTOMATED RECORDATION OF CRANE INSPECTION ACTIVITY

CROSS REFERENCE TO RELATED APPLICATIONS

This application claims priority and is a continuation-in-part to the co-pending patent application Ser. No. 12/193,171 by John Cameron, filed on Aug. 18, 2008, entitled "Construction Equipment Component Location Tracking," and assigned to the assignee of the present application. To the extent not repeated herein, the contents of this related patent application are hereby incorporated herein by reference.

This Application is related to U.S. patent application Ser. No. 12/193,674 by John Cameron, filed on Aug. 18, 2008, entitled "Construction Equipment Component Location Tracking,", and assigned to the assignee of the present application. To the extent not repeated herein, the contents of this related patent application are hereby incorporated herein by reference.

This Application is related to U.S. patent application Ser. No. 12/196,805 by John Cameron, filed on 08/22/2008, entitled "Monitoring Crane Component Overstress," and assigned to the assignee of the present application. To the extent not repeated herein, the contents of this related patent application are hereby incorporated herein by reference.

BACKGROUND

Construction equipment items such as cranes and excavators are typically delivered to a job site (e.g., a construction site) in multiple pieces or components. Often a construction equipment item is so specialized and/or expensive, that a contractor rents it for a particular use or job, and thus the construction equipment is supplied from a rental company, otherwise known as a "rental yard." Regardless of the source, many of these items of construction equipment, and components thereof, are expensive and complex and require periodic inspection and maintenance to be safely (and in some instances legally) assembled and operated.

Cranes in particular are expensive and complex to operate and maintain, and as such are often used heavily on construction sites in order to minimize the time of use and there for the cost of using the crane. This is especially the case with rented cranes. However, due to the expense of downtime for inspection and maintenance, cranes are often inadequately inspected and/or maintained. Shoddy maintenance, improper maintenance, infrequent maintenance, improper inspection, infrequent inspection, lack of inspection, lack of inspectors, overworked inspectors, and poor/incorrect documentation of required inspections are but a handful of contributors to the many catastrophic and often deadly crane collapses and accidents that occur yearly on construction job sites and other locations where cranes are used.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Figure 1:
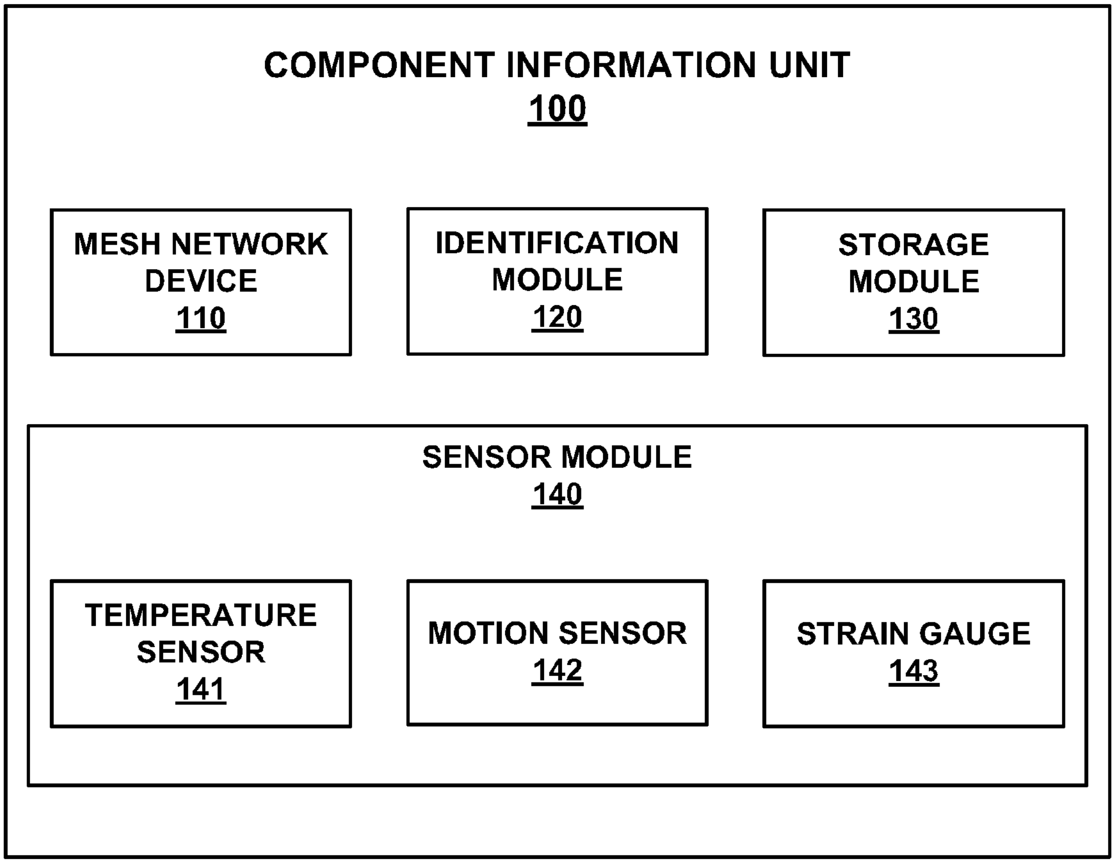
FIG. 1 is a block diagram of an example component information unit, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and modules described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as “initiating,” “storing,” “transmitting,” “receiving,” “recording,” “incorporating,” “engaging,” “providing,” “creating,” “communicating,” “authenticating,” “accessing,” or the like, refer to the actions and processes of a computer system or similar electronic computing device such as, but not limited to, a component information unit, a component monitor, a record repository unit, and/or an inventory unit (all described herein). The electronic computing device manipulates and transforms data represented as physical (electronic) quantities within the device’s registers and memories into other data similarly represented as physical quantities within the devices memories or registers or other such information storage, transmission, or display components.

Overview of Discussion

Discussion below is divided into multiple sections. Section 1 describes a component information unit and its environment of use, a component monitor and an environment for its use, and a method of using the component information unit for tracking the location of a construction equipment component. Section 2 describes an inventory unit for construction equipment components, a system for tracking the location of a construction equipment component, a method of using the system for tracking the location of a construction equipment component, and a data mule for transporting information and/or bridging communications to assist in tracking the location of a construction equipment component. Section 3 describes systems and methods for monitoring crane component overstress conditions which can occur, for example, when a crane lifts or attempts to lift a load which is beyond its rated lift capacity. As described herein, in various embodiments, crane component overstress monitoring can be performed using a component monitor coupled with a load sensor of a crane and/or with a component information unit coupled with a crane component. Section 4 describes apparatus(es), systems, and methods for automated recordation of crane inspection activity. As described herein, in various embodiments, an inspection record, to which other inspection information can be added, is automatically created and stored in response to the occurrence of a crane inspection activity.

SECTION 1

Component Information Unit

FIG. 1 is a block diagram of an example component information unit 100, in accordance with an embodiment. Component information unit 100 is configured for mechanically coupling with a construction equipment component. Component information unit 100 operates to identify a component with which it is coupled and to access and exchange information (both via wireless mesh network communications). In one embodiment, component information unit 100 accesses and/or exchanges information with one or more other component information units and/or with a component monitor (e.g., component monitor 300 of FIG. 3) via wireless mesh network communications. This wireless mesh network communication can be initiated on an ad hoc basis, when the opportunity presents itself, in response to one or more of a variety of triggers.

Some non-limiting examples of non-destructive mechanical coupling mechanisms which component information unit 100 can utilize for mechanical coupling to a construction equipment component include: hook and loop fasteners, adhesives, epoxies, adhesive tape, magnets, and plastic line ties. In some embodiments, particularly where structural integrity of the construction equipment component is not an issue, other mechanisms of mechanical coupling which can be utilized can include bolts, screws, rivets, welds and other well known mechanisms for mechanical coupling.

By construction equipment component or simply “component,” what is meant is a generally large component part of an item of construction equipment which may be separated from and/or stored separately from the item of construction equipment with which the component is utilized. Some non-limiting examples of construction equipment components with which component information unit 100 can be coupled and utilized include: components, sections and structural members (whether unique or modular) of a crane boom, crane jib (e.g., load jib), crane counterweight jib, crane tower, gantry, crane trolley, crane cat head, crane boom tip or the like; blades, buckets, implements, and/or attachments for dozers, graders, trucks, tractors, backhoes, cranes, loaders, forklifts, and the like; and trailers for trucks. In some embodiments, a construction equipment component can also comprise an entire item of small high value construction equipment, such as a generator, air pump, trencher, flood light, hydraulic lift, power tool (e.g., concrete saw), or the like.

As shown in FIG. 1, in one embodiment, component information unit 100 comprises a mesh network device 110, an identification module 120, a storage module 130, and a sensor module 140 (which may comprise or be coupled with one or more sensors). Mesh network device 110, identification module 120, storage module 130, and sensor module 140 are communicatively coupled, such as via a bus, to facilitate the exchange of information and instructions. In one embodiment, component information unit 100 is configured with a form factor that is very small relative to a component with which it is intended to be coupled. As a non-limiting example, in one embodiment, the form factor is approximately 2 inches by one inch by one half inch thick. Such a small relative form factor allows for component information unit 100 to be easily coupled with a construction equipment component in a fashion which does not impact the operation or use of the component.

For ease of explanation, certain constituent functions/components of component information unit 100 have been separated as shown in FIG. 1. However, it is appreciated that these may be combined and that additional functions/components may be included in some embodiments. Furthermore, in order to support clarity of explanation several common and well known components and circuits, such as a processor and a power source, are not shown or described extensively herein. This should not be taken to imply that such components are not included. For example component information unit 100 can include an independent processor or utilize a processor that is part of a sub-assembly such as mesh network device 110. As a multitude of construction equipment components possess no independent power source, the power source of component information unit 100 is often an internal battery or other power storage device, however, in some embodiments, a coupling with an external DC power source, such as a battery, solar panel, or DC or AC power source may be used to supply power for component information unit 100.

Mesh network device 110 operates to communicate with other mesh network devices via wireless mesh networks, such as ad hoc wireless mesh networks. Mesh network device 110 performs such wireless communication to access and/or exchange information. By accessing what is meant is that mesh network device 110 receives and/or retrieves information from an entity outside of component information unit 100. By exchanging what is meant is that mesh network device supplies, allows access to, or transmits information to an entity outside of component information unit 100. For example, in one embodiment, mesh network device 110 performs communication to access location information regarding a component with which component information unit 100 is coupled. This location information can be accessed for a variety of reasons, such as: component information unit 100 receiving a roll call signal or other signal which triggers information access; in response to a movement of the component with which component information unit 100 is coupled; in response to a cessation of movement of the component with which component information unit 100 is coupled; and/or in response to a sensor of sensor module 140 exceeding a preset threshold value.

In one embodiment, mesh network device 110 performs a wireless mesh network communication with an external device (e.g., component monitor 300 of FIG. 3) to access the location from a Global Navigation Satellite System (GNSS) receiver that is coupled with or part of the external device. As described herein, the external device which is accessed is typically close to or participating in an inventory movement of a component with which component information unit 100 is coupled. Thus, accessing this location information provides a relative location (e.g. within 100 feet) of component information unit 100 and thereby the component with which component information unit 100 is mechanically coupled.

It is appreciated that other information, such as location information of other components (and their identification) can be accessed as well. It is also appreciated that mesh network device 110 can exchange/provide a variety of information (such as its identity and location and/or previous location(s)) to entities outside of component information unit 100. Such accessed and exchanged information can, for example, comprise: information stored in storage module 130; information stored in identification module 120; information accessed from a component monitor; and/or information accessed/routed from another component information unit. Such information can be exchanged with other component information units and/or component monitors, such as component monitor 300 of FIG. 3.

In one embodiment, mesh network device 110 is or includes a radio frequency transceiver. In various embodiments, mesh network device 110 is configured as, or operates as, an endpoint of a wireless mesh network or a router which can route data from other devices on a wireless mesh network. Mesh network device 110 is a wireless transceiver which operates at short range (e.g., approximately 100 meters or less); at low power settings (such as, for example, approximately 25 mW); at low data rate (e.g., 250 Kbps); and often on an ad hoc basis in response to a triggering event such as sensing of motion, sensing of cessation of motion, elapse of a specified time period (e.g., 10 minutes, 2 hours, a day, etc.), entering communication range of another mesh network device (e.g., sensing the presence of another wireless mesh networking device or a wireless mesh network), and/or in response to a communicatively coupled sensor exceeding a preset threshold value. In one embodiment, mesh network device is configured to spend most of its time in a powered down state to conserve energy, and only wakes up into a powered up state on an ad hoc basis in response to a triggering event as described above.

Mesh network device 110, in various embodiments, operates on one or more frequency ranges which among others can include: the industrial, scientific and medical (ISM) radio bands; 868 MHz; 915 MHz; and 2.4 GHz. It is appreciated that in some embodiments, mesh network device 110 includes a microprocessor or microcontroller and memory (e.g., random access memory and/or read only memory). Mesh network device 110 initiates or operates on a mesh networking protocol which allows mesh networking nodes (such as component information unit 100) to enter and leave a local wireless mesh network at any time. This is called a self-forming, self-organizing, and/or self-healing network. Some examples of a mesh network device which may be utilized to perform some or all of the functions of mesh network device 110 include mesh network devices that are compliant with the ZigBee® specification and mesh network devices that are compliant with the Institute of Electrical and Electronics Engineers (IEEE) 802.15.4 and/or IEEE 802.11s standard for wireless personal area networks (WPANs).

Identification module 120 includes an identifier such as a number or alphanumeric which is used to identify component information unit 100 and thus the component with which component information unit 100 is coupled. This identifier can be assigned by a user or can be pre-configured within identification module 120. For example, in one embodiment the identifier is associated such as by a manufacturer, rental yard operator, standards organization, or other entity, with a particular component (such as in an inventory of components). This identifier can serve as an identification of the component or class/type of a component, such as for inventory, location tracking, and/or other purposes.

Identification module 120 operates, in association with the communicating performed by mesh network device 110, to identify a component with which component information unit 100 is coupled. Thus, in one embodiment, identification module 120 supplies the identifier for transmission in conjunction with some or all communications performed by mesh network device 110. In one embodiment, identification module 120 supplies the identifier for transmission to an outside entity in response to a roll call or some other signal received from an outside entity. It is appreciated that, in some embodiments, identification module 120 may comprise an identifier in a storage location which is part of mesh network device 110, such as a portion of a random access memory or a read only memory of mesh network device 110.

Storage module 130 stores information regarding a component with which component information unit 100 is coupled. This information can comprise storage of location information regarding the component, including historical records of location information regarding the component. This information can also comprise storage of information collected by one or more sensors, such as sensors of sensor module 140. In some embodiments, storage module 130 also stores information received, via wireless mesh network communication, from other entities such as component monitors (e.g., component monitor 300 of FIG. 3) or component information units coupled with other components. In one embodiment, storage module 130 stores locations of a variety of components in conjunction with their identities (and in some embodiments a timestamp), after receipt of such information from other entities, such as component information units coupled with other components. Additional information received regarding other components can also be stored. It is appreciated that, in some embodiments, storage module 130 may partly or entirely comprise a storage mechanism which is included in mesh network device 110, such as a random access memory of mesh network device 110.

Sensor module 140 comprises at least one sensor for sensing information, such as environmental information, related to a component with which component information unit 100 is coupled. This can include sensing information such as temperature, motion, cessation of motion, strain (or the like), among other information. Sensed information can be stored, such as in storage module 130, or transmitted in a communication to another entity via mesh network device 110.

In some embodiments, sensor module 140 also comprises circuitry, logic, and/or processing capability and computer-readable instructions for interpreting sensed information, such as whether a sensed input violates a threshold or range which is maintained in sensor module 140 (or elsewhere in component information unit 100). When such a violation is determined to have occurred, a preset action is triggered. For example, in one embodiment, a record of the violation is stored, such as in storage module 130. In another embodiment, a message is generated and supplied to mesh network device 110 for transmission to an entity external to component information unit 100, such that the external entity is made aware of the violation which has been sensed. In the case of a violated time-fence or geo-fence such a message can be used as a notification that a component is being stolen, used at a location which is not authorized (such as in a rental contract), and/or used at a time that is not authorized (such as in a rental contract).

In one embodiment sensor module 140 includes a temperature sensor 141. Temperature sensor 141 senses a temperature of a component (or its environment) with which component information unit 100 is coupled. This can comprise a temperature sensed during operation, storage, or transportation of a component, or a temperature sensed in response to a signal (such as a roll call signal) received from an outside entity by component information unit 100. Thermistors and resistance temperature sensors are some examples of sensors which can be utilized as temperature sensor 141. However, other well known mechanisms for sensing temperature can be employed as temperature sensor 141. In one embodiment, sensor module 140 determines whether a measurement from temperature sensor 141 violates a preset threshold or range.

In one embodiment sensor module 140 includes a motion sensor 142. Motion sensor 142 senses movement or a cessation of movement of a component with which component information unit 100 is coupled. Roll ball switches, tilt switches, vibration switches, centrifugal switches, optical roll ball switches, mercury switches, accelerometers, and strain gauges are some examples of sensors which can be utilized as motion sensor 142. However, other well known mechanisms for sensing motion can be employed as motion sensor 142. In one embodiment, sensor module 140 determines whether a measurement from motion sensor 142 indicates an occurrence of motion or whether a measurement from motion sensor 142 violates a preset threshold, preset range, preset time-fence, or preset geo-fence.

In one embodiment sensor module 140 includes a strain gauge 143. Strain gauge 143 senses strain, compression, stress or other mechanical flexing of a component with which component information unit 100 is coupled. Typically, this sensing is performed during operation of the component, but can also be performed in response to a trigger or at a time interval. For example, the sensing of strain gauge 143 can be performed in response to motion being sensed by motion sensor 142. The sensing of strain gauge 143 can be performed in response to a signal (such as a roll call signal) received from an outside entity by component information unit 100. It is appreciated that, in some embodiments, an epoxy or adhesive used to affix strain gauge 143 to a component also simultaneously mechanically couples component information unit 100 to the same component. In some embodiments, sensor module 140 includes a plurality of strain gauges 143. For example, each of a plurality of strain gauges 143 can be oriented and coupled with a component in a fashion to facilitate sensing a particular type of mechanical flexing experienced by the component. In one embodiment, sensor module 140 determines whether a measurement from strain gauge 143 violates a preset threshold, preset range, preset time-fence, or preset geo-fence.

Figure 2:
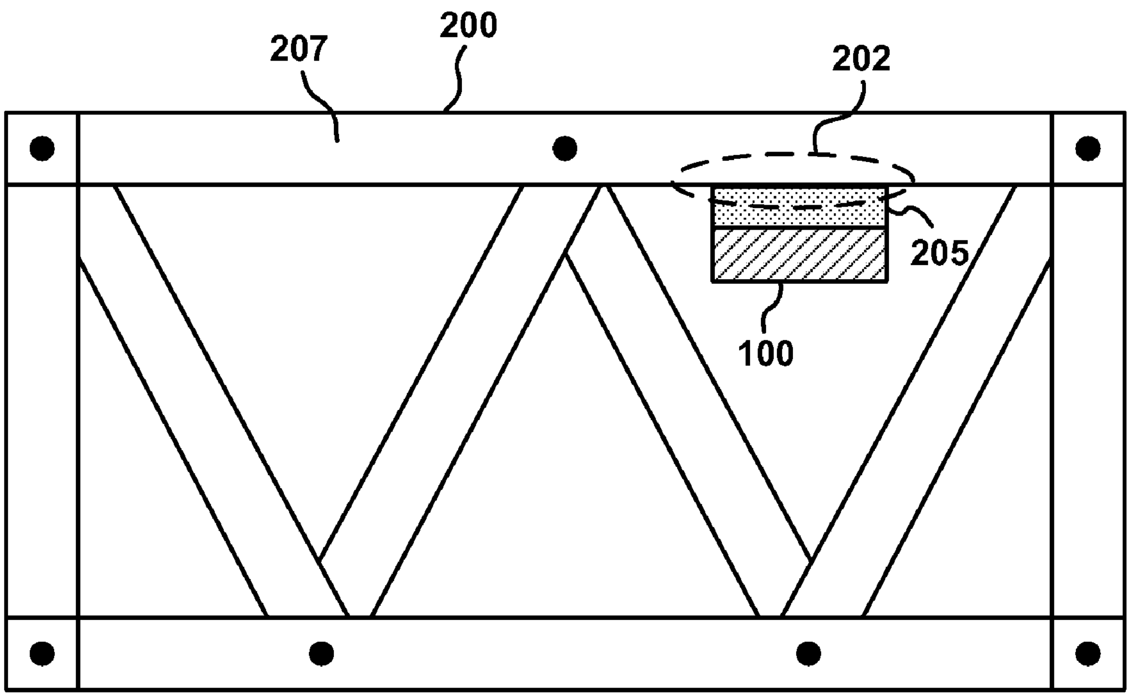
FIG. 2 shows a component information unit coupled with a construction equipment component, in accordance with an embodiment.

FIG. 2 shows a component information unit 100 coupled with an example construction equipment component 200, in accordance with an embodiment. As shown in FIG. 2, construction equipment component 200 is a crane component (e.g., a modular crane jib component) which is one of a plurality of crane components which together can be assembled into one or more configurations of the jib of a crane. Component 200 is shown as a crane component by way of example and not of limitation. Thus, it is appreciated that component 200 is not limited to being a crane component, and can instead be any of a variety of other construction equipment components, such as those previously described above. As shown in FIG. 2, a mechanical coupling 205 (e.g., an adhesive, epoxy, magnet, plastic line tie, hook and loop fastening, or other non-destructive mechanical coupling) is used to mechanically couple component information unit with component 200. In some embodiments, other mechanical coupling mechanisms such as bolts, screws, rivets, welds, and the like may be utilized for mechanical coupling 205.

Component information unit 100 is affixed to an attachment point, such as attachment point 202, on a component. As shown in FIG. 2, attachment point 202 can be on a structural member, such as structural member 207. In some embodiments, a component, such as component 200, is manufactured with a designated attachment point 202 marked or a preconfigured attachment point 202 (e.g., a tab, protected box, bracket, or mounting plate) for affixing component information unit 100 via mechanical coupling 205. The location and/or orientation for coupling component information unit 100 can be chosen or designated based on one or more of a variety of factors. Such factors include, but are not limited to: a location to sense a particular strain on a structural member of component 200; a location to sense movement; a location which minimizes disruption to handling of component 200; a location which minimizes disruption to operational use of component 200; and/or a location which will protect component information unit 100 from physical damage which could occur due to handling, transportation, or operation of component 200.

Component Monitor

Figure 3:
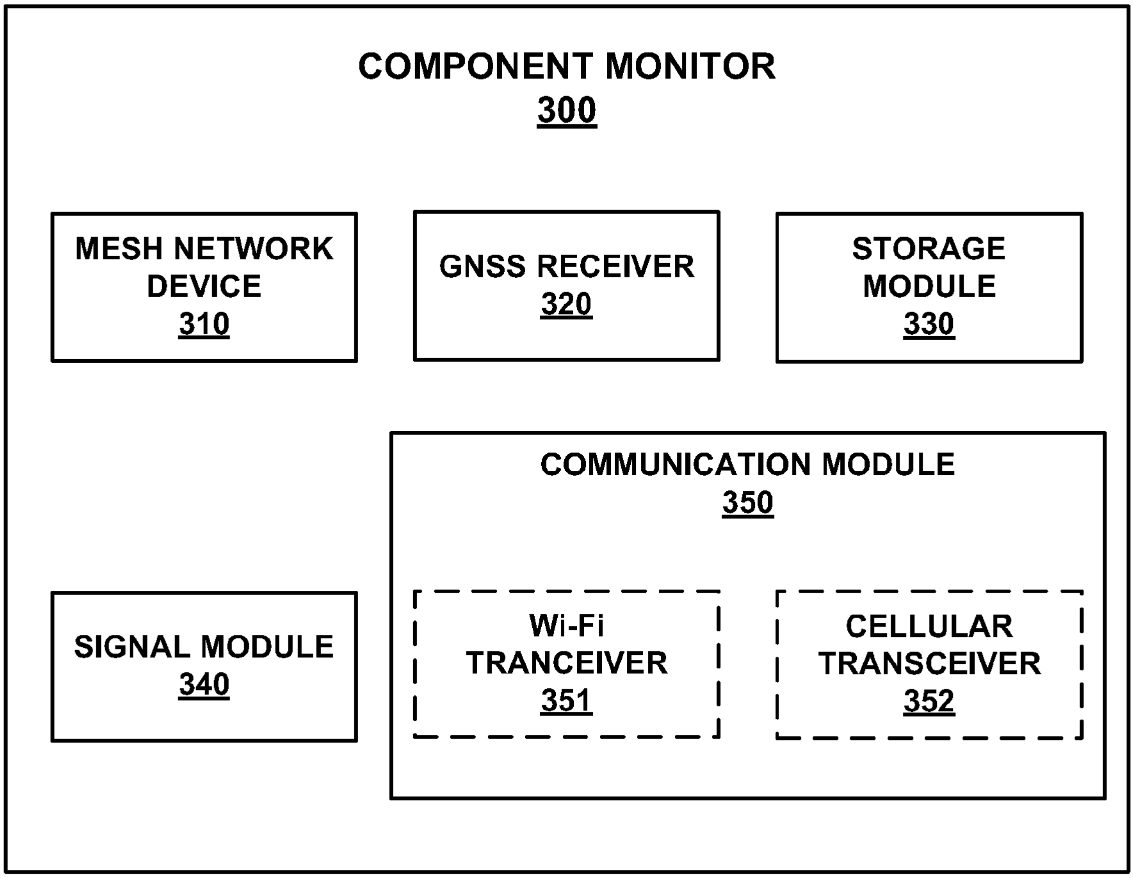
FIG. 3 is a block diagram of an example component monitor, in accordance with an embodiment.

FIG. 3 is a block diagram of an example component monitor 300, in accordance with an embodiment. As shown in FIG. 3, in one embodiment, component monitor 300 comprises a mesh network device 310, a GNSS receiver 320, a storage module 330, a signal module 340, and a communication module 350 (which may comprise or be coupled with one or more communication mechanisms). In one embodiment, component monitor 300 is configured as a hand held portable device. In another embodiment, component monitor 300 is coupled with an item of construction equipment or with a vehicle such as an inventory positioning vehicle which is utilized to transport or position construction equipment components such as component 200.

For ease of explanation, certain constituent functions/components of component monitor 300 have been separated as shown in FIG. 3, however, it is appreciated that these may be combined and that additional functions/components may be included in some embodiments. Furthermore, in order to support clarity of explanation several common and well known components and circuits, such as a processor and a power source, are not shown or described extensively herein. This should not be taken to imply that such components are not included. For example component monitor 300 can include an independent processor or utilize a processor that is part of a sub-assembly such as mesh network device 310. A power source may include an internal battery or other power storage device or a coupling to an external power source, such as a voltage supplied by a vehicle or item with which component monitor 300 is coupled.

Mesh network device 310 is a mesh networking device which communicates with one or more component information units, such as component information unit 100, via a wireless mesh network. In one embodiment, mesh network device 310 communicates via a wireless mesh network, which may be initiated on an ad hoc basis, to access an identity of a component with which component information unit 100 is coupled. Mesh network device 310 differs slightly from mesh network device 110 in that it may also operate as a bridge to other networks via an independent coupling or via a coupling to communication module 350. However, from a technical specification standpoint, mesh network device 310 is essentially the same as mesh network device 110. Thus, for purposes of brevity and clarity reference is made to previous description herein of mesh network device 110 for description of mesh network device 310. Some examples of the independent coupling and/or the coupling mechanism available via communication module 350 include couplings which are: Wi-Fi alliance compatible; WiMAX (Worldwide Interoperability for Microwave Access); compliant with the IEEE 802.11 family of standards; compliant with Bluetooth®; compliant with the IEEE 802.16 standards; or utilize cellular, two-way radio, or other wireless standards of communication. Additionally, in one embodiment, a wireline coupling to another network or device is available via communication module 350.

GNSS receiver 320 provides a location such as a latitude and longitude at a particular point in time. Consider an example, where component monitor 300 is in proximity to component 200 while component 200 is being transported, inventory positioned, or operated (e.g., component monitor 300 could be coupled with a forklift which is positioning component 200). In such an example, the location provided by GNSS receiver 320 is a relative positional location (typically within ten feet of the actual location) of a component. This relative positional location can be provided to a component information unit 100, accessed by a component information unit 100, or can be stored in storage module 330. The positional location may be relative in that GNSS receiver 320 may be located proximate to the component, when the location is noted and associated with the component. Some examples of proximal locations include: on an inventory positioning vehicle, on a data mule, on a truck, on a trailer, on an item of construction equipment of which a component is an assembled part, and/or near an entry/exit to a storage area.

The operation of GNSS receivers, such as GNSS receiver 320, is well known. However in brief, GNSS receiver 320 is a navigation system that makes use of a constellation of satellites orbiting the earth which provide signals to a receiver (e.g., GNSS receiver 320) that estimates its position relative to the surface of the earth from those signals. Some examples of such satellite systems include the NAVSTAR Global Positioning System (GPS) deployed and maintained by the United States, the GLObal NAvigation Satellite System (GLONASS) deployed by the Soviet Union and maintained by the Russian Federation, the COMPASS (or Beidou) satellite system currently being deployed by China, and the GALILEO system currently being deployed by the European Union (EU). It is appreciated that various enhancements to GNSS receiver 320 may be employed to increase the positional accuracy of its location determinations. Some examples of enhancements include the Wide Area Augmentation System (WAAS), differential GPS (DGPS) and the like; and Real Time Kinematics (RTK).

Storage module 330 stores a location of a component. In one embodiment, the location is stored in association with an identity of the component, wherein the identity is accessed from a component information unit 100 which is mechanically coupled with the component. In one embodiment, the location is also stored in association with a timestamp, such as a current time at the storage of the location of the component, or a timestamp received via communication with a component information unit 100. The stored location can be a location received from GNSS receiver 320 or a location accessed, such as from a storage module 130 of a component information unit 100. Storage module 330 can be implemented by well known methods, including solid state memory such as random access memory or mass storage such as a hard disk drive. It is appreciated that, in some embodiments, storage module 130 may partly or entirely comprise a storage mechanism which is included in mesh network device 310, such as a random access memory mesh network device 310.

Signal module 340, when utilized, provides one or more signals for transmission to and receipt by a component information unit 100. For example, in one embodiment, signal module 340 outputs a signal to indicate movement completion to component information unit 100, which is coupled with a component being moved. A movement completion signal can indicate that an inventory movement of the component has been completed. A movement completion signal can be sent automatically, such as upon a load sensor of an inventory positioning vehicle indicating that a load has been released. A movement completion signal can also be sent in response to an operator input action, such as an operator pushing a button after completion of an inventory movement of a component. It is appreciated that such a movement completion signal can be specifically addressed to a particular component, such as via the inclusion of an identifier associated with a particular component.

In one embodiment, signal module 340 is configured for signaling an information request to a component information unit 100. For example, the information request can request information regarding a component with which component information unit 100 is coupled. The requested information can comprise a request for an identification of the component, a request for stored location information regarding the component, or a request for other information which may be stored in component information unit 100. Such a request signal can comprise an individually addressed signal, a signal addressed to a class or group of components (e.g., all crane components) or a generically addressed signal which would be responded to by any component information unit 100 in receipt. One example of a generically addressed request signal is a roll call signal. In one embodiment, a roll call signal requests identity information from all component information units 100 in receipt of the roll call signal. It is appreciated that additional signals can be sent from signal module 340 in other embodiments, and that these signals may request or provide particular information, or request performance of a particular action.

Communication module 350 provides a bridge for linking component monitor 300 with another network or entity outside of any wireless mesh network in which component monitor 300 participates. In one embodiment, communication module 350 establishes communication with an inventory unit (e.g., inventory unit 900 shown in FIG. 9) to transfer some or all information regarding component location and identity from component monitor 300 to inventory unit 900. In one embodiment, inventory unit 900 maintains an inventory of component locations, identities, and/or other information received from or accessed from component monitor 300 via communication module 350 is incorporated in this inventory.

In one embodiment, communication module 350 comprises a wireless communication module which facilitates wireless communication with a network or entity, such as an inventory unit. Communication module 350 can incorporate one or more wireless transceivers such as, but not limited to a WiMAX compatible transceiver, a Wi-Fi compatible transceiver, an IEEE 802.11 compatible transceiver, a Bluetooth® compatible transceiver, an 802.16 compatible transceiver, a two-way radio transceiver, a cellular transceiver, or other wireless transceiver. By way of example and not of limitation, communication module 350 has been shown in FIG. 3 as including Wi-Fi transceiver 351 and cellular transceiver 352.

It is appreciated, that in one embodiment, communication module 350 or some other portion of component monitor 300, also includes a wireline communications capability, such as a serial data transceiver (e.g., a Universal Serial Bus or the like). In one embodiment, all or part of the functionality of communication module 350 may be incorporated into another portion of component monitor, such as mesh network device 310. In some embodiments, communication module 350 is used to bridge communication from mesh network to another network or entity. Actively bridging communications in this fashion facilitates real-time streaming of communication to and from the mesh network and another network or entity which is linked into the mesh network via the bridge.

Figure 4:
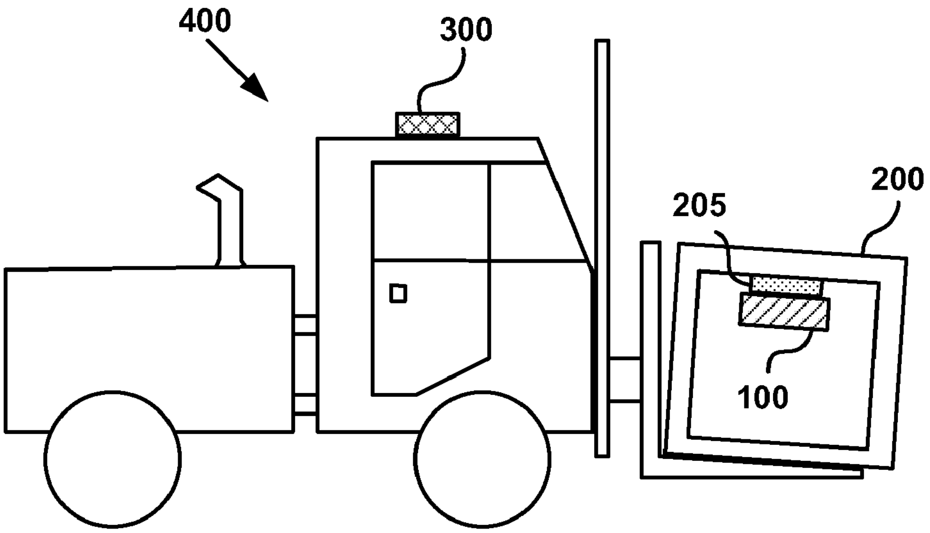
FIG. 4 shows a component monitor coupled with a forklift, in accordance with an embodiment.

FIG. 4 shows a component monitor 300 coupled with a forklift 400, in accordance with an embodiment. In one embodiment, forklift 400 is used as an inventory positioning vehicle which moves construction equipment components (e.g., component 200) from location to location in inventory movements in a component storage area. It is appreciated that forklift 400 can also move component 200 or other components in other scenarios, such as, for example, at a job site.

Figure 5:
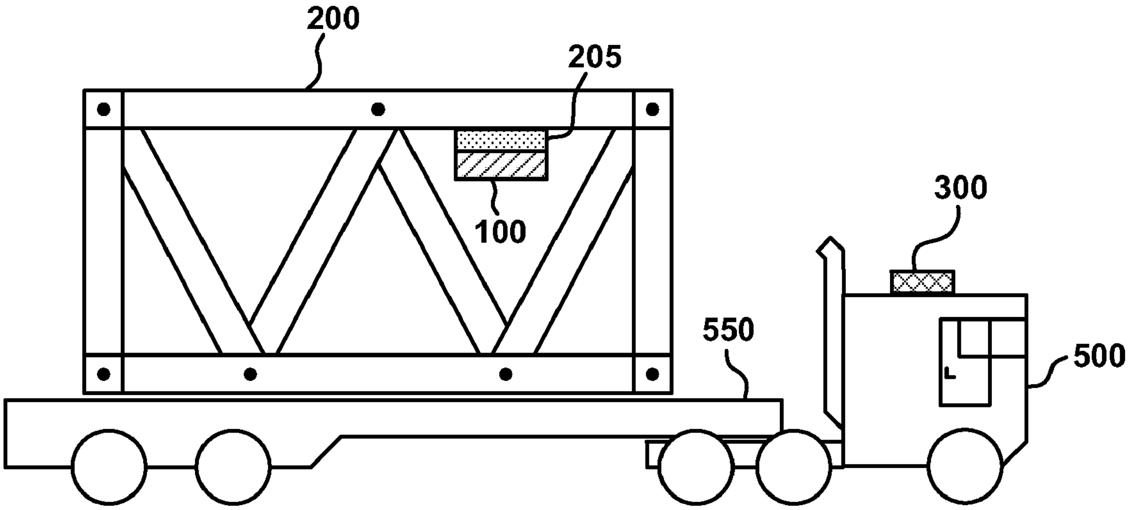
FIG. 5 shows a component monitor coupled with a truck, in accordance with an embodiment.

FIG. 5 shows a component monitor 300 coupled with a truck/tractor 500, in accordance with an embodiment. In one embodiment, truck 500 is used as an inventory positioning vehicle which moves construction equipment components (e.g., component 200) from location to location in inventory movements in a component storage area. It is appreciated that truck 500 can also move component 200 or other components in other scenarios, such as, for example: at a job site; between a storage area and a job site; between a manufacturer and a purchaser; and the like. In a configuration where truck 500 is configured with a separable trailer 550, a component monitor 300 can alternatively or additionally be coupled with trailer 550.

Figure 6:
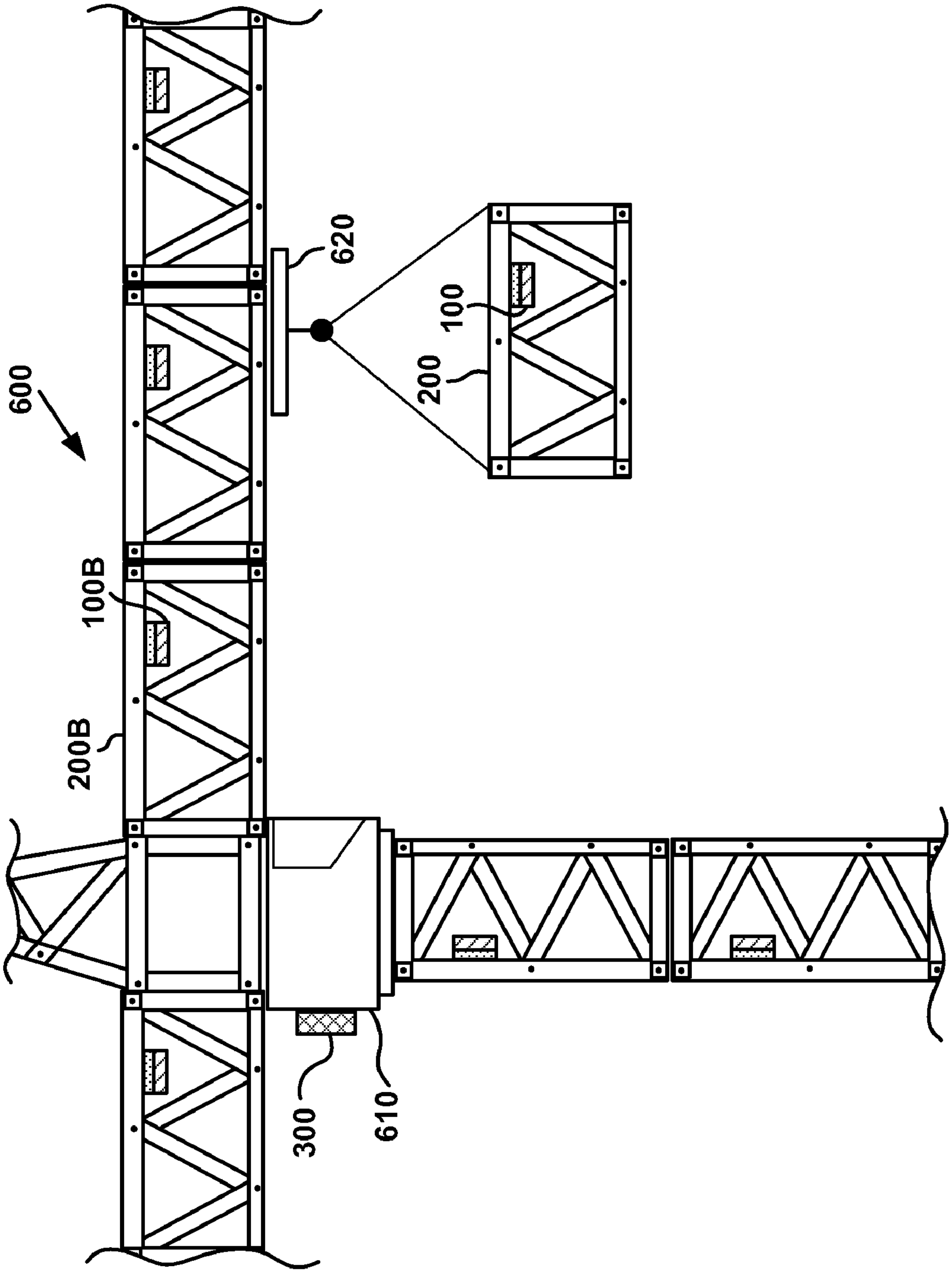
FIG. 6 shows a component monitor coupled with a crane, in accordance with an embodiment.

FIG. 6 shows a component monitor 300 coupled with a crane 600, in accordance with an embodiment. By way of example and not of limitation, crane 600 is shown as a tower crane. It is appreciated that crane 600 can be any type of crane, including, but not limited to: a wheel mounted crane, a truck mounted crane, a crawler mounted crane, a gantry crane, an overhead crane, a monorail carrier, a stiff legged derrick, a straddle crane, a crane with a fixed boom, a crane with a telescoping boom, and a crane with a hoist but no boom. As shown in FIG. 6, component monitor 300 is coupled with crane cab 610, but may be coupled with some other portion of crane 600. In one embodiment, crane 600 is used as an inventory positioning vehicle which moves construction equipment components (e.g., component 200) from location to location in inventory movements in a component storage area. It is appreciated that crane 600 can also move component 200 or other components in other scenarios, such as, for example, at a job site or a manufacturing site.

As illustrated by FIG. 6, crane 600 is comprised of modular components, such as crane component 200B. For purposes of example, component 200B is a modular component similar to component 200, which is shown suspended from trolley 620 of the load jib of crane 600. A component information unit 100B is mechanically coupled with crane component 200B. FIG. 6 provides one example illustrating that similar components (e.g., 200 and 200B) may exist in a storage area, in an assembled construction equipment item such as crane 600, on a job site, in a manufacturing facility, or at some other location or combination of construction equipment item and location.

Hand-Holdable Portable Component Monitor

Figure 7:
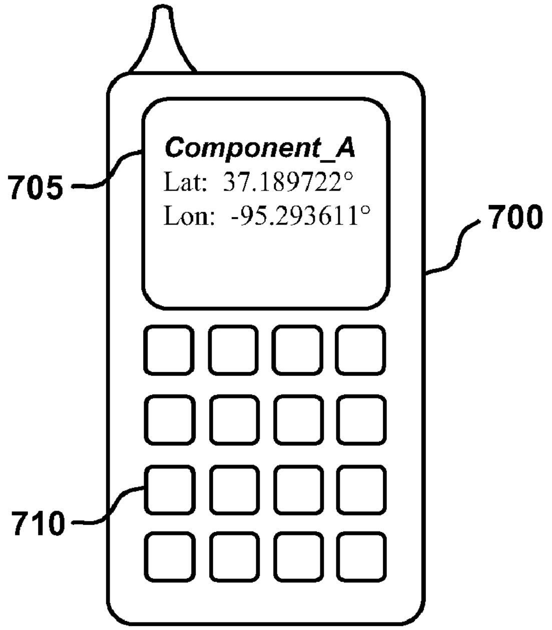
FIG. 7 shows an example of a component monitor configured within a hand-holdable portable device, in accordance with an embodiment.

FIG. 7 shows an example of a component monitor 300 configured within the form factor of a hand-holdable portable device 700, in accordance with an embodiment. It is appreciated that hand-holdable portable device 700 may be a standalone single purpose device, or that it may serve multiple purposes, such as also being a Personal Digital Assistant, hand held computer, cellular phone, or the like. In one embodiment, hand-holdable portable device 700 is equipped with a display 705 for displaying a variety of information, such as information accessed from a component information unit 100 that is coupled with a construction equipment component. In some embodiments, hand-holdable portable device 700 also includes a user input 710 such as a keypad, keyboard, touchpad, touch screen, or other mechanism for user input and/or for selecting commands, functions, or signals produced or activated. In some embodiments, hand-holdable portable device 700 also includes a digital camera.

In one embodiment, hand-holdable portable device 700 is used by a job site worker, storage area worker, a transportation worker, an inspector (e.g., a crane component inspector), or other person or entity to access information from and/or provide information or instruction to a component information unit, such as component information unit 100. In one embodiment, hand-holdable portable device 700 is coupled (e.g., mechanically coupled or removably mechanically coupled) with a vehicle, such as an inventory positioning vehicle or other vehicle which is used to transport or position construction equipment components, such as component 200.

Figure 8:
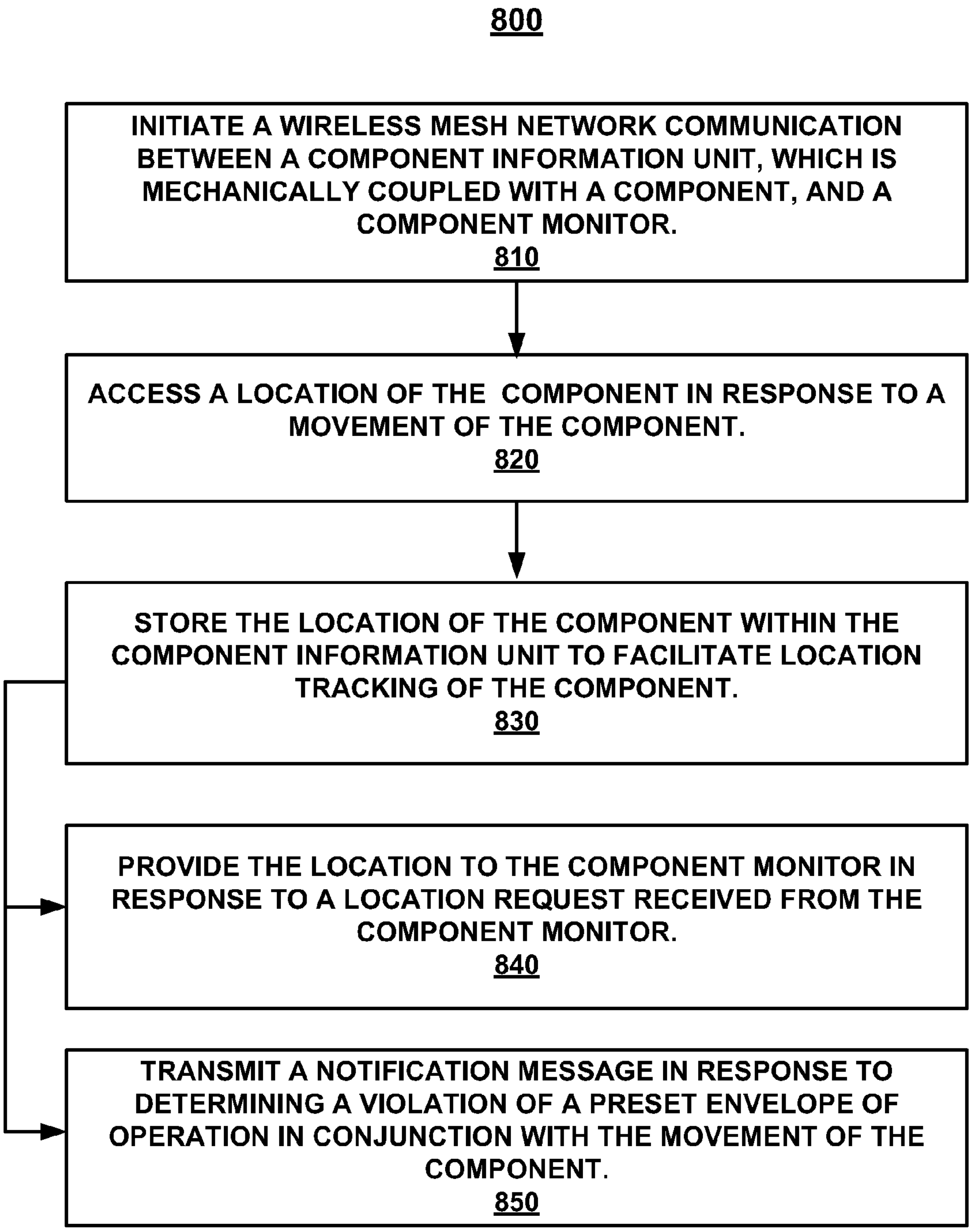
FIG. 8 is a flow diagram of an example method for construction equipment component location tracking, in accordance with an embodiment.

Example Method of Component Location Tracking with a Component Information Unit With reference to FIG. 8, flow diagram 800 illustrates example operations used by various embodiments. Flow diagram 800 includes processes and operations that, in various embodiments, are carried out by a processor under the control of computer-readable and computer-executable instructions. The computer-readable and computer-executable instructions reside, for example, in data storage features such as volatile memory, non-volatile memory, and/or storage module 130 (FIG. 1). The computer-readable and computer-executable instructions can also reside on computer readable media such as a hard disk drive, floppy disk, magnetic tape, Compact Disc, Digital Versatile Disc, and the like. The computer-readable and computer-executable instructions, which may reside on computer readable media, are used to control or operate in conjunction with, for example, component information unit 100.

FIG. 8 is a flow diagram 800 of an example method for construction equipment component location tracking, in accordance with an embodiment. Reference will be made to FIGS. 1, 2, 3, and 4 to facilitate the explanation of the operations of the method of flow diagram 800. In one embodiment, the method of flow diagram 800 is performed using a component information unit 100 which is mechanically coupled with a component, such as component 200.

At operation 810, in one embodiment, a wireless mesh network communication is initiated between a component monitor and a component information unit which is mechanically coupled with the component being tracked. For example, in one embodiment, this comprises initiating a wireless mesh network communication between component information unit 100 and component monitor 300. The communication can be initiated either by component information unit 100 or by component monitor 300. For purposes of this example, component information unit 100 is coupled with component 200 as shown in FIG. 2. Also, for purposes of this example, component monitor 300 is coupled with an inventory positioning vehicle, such as forklift 400 as shown in FIG. 4.

In one embodiment, the wireless mesh network communication is initiated ad hoc, such as in response to one or more triggers or triggering events such as: sensing of movement of component 200 with motion sensor 142 of component information unit; and/or mesh network device 110 sensing radio frequency emanations from component monitor 300, thus indicating the presence of a wireless mesh networking device which is in range and with which ad hoc communications can be established. In one embodiment, a combination of triggers causes communication to be initiated. For example, when movement is sensed and presence of component monitor 300 is sensed, component information unit 100 initializes the wireless mesh network communication between component information unit 100 and component monitor 300.

In one embodiment, prior to wireless mesh network communication being initiated, component information unit 100 is in a low power or sleep mode which is used to conserve power (such as battery power). Component information unit 100 wakes up in response to one or more triggering events such as sensing of movement and/or sensing of another wireless mesh networking device within communication range.

In one embodiment, the component (e.g., component 200) with which component information unit 100 is coupled is identified to component monitor 300 during the wireless mesh network communication. This can be done by transmitting the identifier stored in identification module 120 or by allowing component monitor to retrieve the identifier from identification module 120. In one example, all outgoing communications from component information unit 100 include the identifier from identification module 120 as a portion (e.g., message header) of the communications.

At operation 820, in one embodiment, a location of the component is accessed in response to a movement of the component. This can comprise accessing the location upon cessation of a component movement and/or at a time while movement of the component is still taking place. Such a movement can comprise an inventory movement. In various embodiments what is meant by accessing is that component information unit 100 can request, receive, or retrieve this location (or information from which the location can be determined) from GNSS receiver 320 or some other entity external to component information unit 100. Following the above example, this can comprise accessing the location of component 200 as determined by GNSS receiver 320 of component monitor 300. Consider an embodiment, where GNSS receiver 320 reports a positional location of 37.1897220 (latitude), −95.293611° (longitude) upon cessation of a component movement of component 200. In such an embodiment 37.189722°, −95.293611° becomes the location which is accessed and attributed as the location of component 200 at the time of cessation of movement of component 200.

In one embodiment, what is meant by "cessation of a component movement" is completion of an inventory movement of component 200. Thus in one embodiment, the location is accessed upon receiving a movement completion signal, at component information unit 100. Such a movement completion signal can be generated by signal module 340 and sent from component monitor 300 to component information unit 100 via a wireless mesh network communication. The movement completion signal indicates a completion of an inventory movement of component 200 and may be triggered in various ways, such as release of a load as measured by a load sensor of forklift 400 or by initiation of an operator of forklift 400 (e.g., by pushing a button when an inventory movement is complete).

In one embodiment, what is meant by "cessation of a component movement" is a failure to sense movement of component 200 or a sensing of no movement of component 200. Such conditions can occur at the completion of an inventory movement operation and can also occur in conjunction with other movements of component 200. In one embodiment, the location is accessed upon sensing a cessation of movement of component 200 as indicated by motion sensor 142. For example, if no motion or change in motion is sensed by motion sensor 142 for a particular period of time (e.g., 5 seconds, 15 seconds, 30 seconds), the location is accessed. In some embodiments, a combination of inputs is used to trigger accessing of the location of component 200. As an example, in one embodiment, the location of component 200 is accessed when both a cessation of movement is sensed and some type of inventory movement signal/inventory movement completion signal is received.

In one embodiment, a location or approximate location of component 200 can be accessed by accessing the location of a component which is near component 200. By near, what is meant is within direct wireless mesh network communication range of component information unit 100. As the direct communication range of the wireless mesh network device 110 is fairly localized, with respect to the size of a typical component storage area, accessing a location of another component with which direct communication can be established can provide an approximate location of component 200 (e.g., likely within 100 feet). While this location may not always be as precise as is desirable for some purposes, it serves to generally indicate that component 200 is/was at a particular location (e.g., a storage area) at a particular time (when a timestamp is used).

Consider the example above where the location of component 200 is 37.189722°, −95.293611°. In one embodiment, if this location is unable to be accessed, such as from component monitor 300, an approximate location is instead accessed via direct mesh network communication with a nearby component's component information unit. For purposes of this example, a nearby component within direct mesh network communication range (e.g., no hops or intermediate mesh network nodes) has a most recently stored location of 37.189725°, −95.293618° stored in its storage module. In this example, the location of 37.189725°, −95.293618° is accessed upon cessation of movement of component 200. This location is not as accurate as 37.189722°, −95.293611°, but it provides a location which is with several feet (approximately within the maximum direct mesh network communication radius) of the actual location of component 200.

In an embodiment where several other components with communication information units are within direct mesh network communication range, the location of component 200 can be further estimated by interpolation (such as averaging) the locations received from several component information units, or choosing the location associated with a component information unit exhibiting the highest signal strength, highest signal to noise ratio, and/or quickest response time during a direct communication. In some embodiments, where the locations of several other components are accessed via direct mesh network communication, the location of component 200 is calculated. For example, through measurement of signal strength and/or propagation delay time in transmissions/responses mesh network device 110 can determine approximate distances to other components. A location of component 200 can then, in some embodiments, be triangulated from locations accessed from the other components.

In one embodiment, in addition to accessing a location at the completion of a movement, a location of a component 200 is also accessed by component information unit 100 at the beginning (initiation of a movement) and/or at periodic intervals during the movement. Additionally, in one embodiment, a timestamp is also accessed in conjunction with accessing of a location. The timestamp is typically a representation of the particular time at which the location is accessed.

At operation 830, in one embodiment, the location of the component is stored within the component information unit to facilitate location tracking of the component. In one embodiment, this comprises storing the accessed location within a storage of component information unit 100, such as storage module 130. In one embodiment, when the location is stored, it supplants or causes the erasure of a previously stored location. In one embodiment, when the location is stored, it becomes the most recently stored location in a list of stored locations. In one embodiment, a timestamp is associated with the accessed location and stored in association with the location. The timestamp can be accessed in a similar manner as the accessing of the location, or the timestamp can be generated locally such as by a clock (e.g., a clock of mesh network device 110). In one embodiment, the timestamp represents a date time group (DTG) comprising a date and time of day of that the location was accessed and/or stored.

The stored location within component information unit 100 facilitates location tracking of the component because it can be accessed, such as by component monitor 300, at a later time. Consider an example where component monitor 300 sends a roll call signal or a location request signal out on a wireless mesh network of which component information unit 100 is a party. Component information unit 100, in one embodiment, responds by providing an identity and a location (e.g., a most recently stored location) of component 200. This allows an operator to quickly locate component 200, such as in a storage yard, even if component 200 is covered with weeds or obscured by other components. When a time series of locations is stored within component information unit 100, this information can be later accessed and serve as a location log for component 200.

At operation 840, in one embodiment, the location is provided to the component monitor. For example, in one embodiment, the location of component 200 is provided to component monitor 300. The location can be automatically provided, or provided in response to a location request received from component monitor 300. As described above such a request can take the form of a roll call signal, location request signal (e.g., a signal addressed to a class of components, an individual component, or to all components), or some other signal. Such signals are generated, in one embodiment, by signal module 340.

Consider an example, where an operator is driving forklift 400 through a storage area and is searching for component 200. In response to a request from the operator, component monitor 300 sends out a location request signal addressed to component 200 (e.g., addressed with an identifier associated with component 200). Component information unit 100 responds by sending an identifier and stored location to component monitor 300. Using this information, forklift 400 is driven directly to the location of component 200, thus reducing or eliminating time that would otherwise be spent searching for component 200.

At operation 850, in one embodiment, a notification message is transmitted in response to determining a violation of a preset envelope of operation in conjunction with the movement of the component. The notification message identifies the component and includes information regarding the type of envelope violated. The notification message and can also include other information, such as a location and/or timestamp associated with the envelope violation. This can comprise component information unit 100 transmitting a notification message to component monitor 300 (or other component monitor) or to another entity on a wireless mesh network when a violation of a preset threshold or range is determined by sensor module 140.

In one embodiment, the notification message indicates that motion has been sensed at a time which violates a preset time of operation envelope (e.g., a time-fence) stored within component information unit 100. A time-fence as described herein can comprise a stored range set of ranges of allowed or disallowed times and/or dates of operation related to the component. In one embodiment, the notification message indicates that motion has been sensed while component 200 is at a location which violates a preset location of operation envelope (e.g., a geo-fence) stored within component information unit 100. A geo-fence as described herein can comprise a stored set of geographic points which define an authorized or unauthorized area or areas of operation for a component. In one embodiment, the notification message indicates that mechanical flexing or strain has been sensed which violates an envelope of operation (e.g., a range of acceptable strain or a maximum allowed threshold of strain) stored within component information unit 100.

Operational envelopes associated with a notification message can be preset (e.g. stored with component information unit 100) to ensure safe operation of a component or to ensure operation on a component in a manner which is consistent with the manner for which the component was contracted for use (e.g., rented for use only on a Friday with a return date of Monday, and thus no use authorized on Saturday or Sunday). Such a notification can alert a system, entity, or person that a component is moved or used in a manner, location, or time period which is not expected, authorized, and/or allowed. In an environment such as a storage area or job site, this can comprise transmitting the notification message to a component monitor which is positioned at a gate or other entrance/egress point, such that the notification message is transmitted to the component monitor when the component is being stolen or moved in an unauthorized manner.

SECTION 2

Example Inventory Unit

Figure 9:
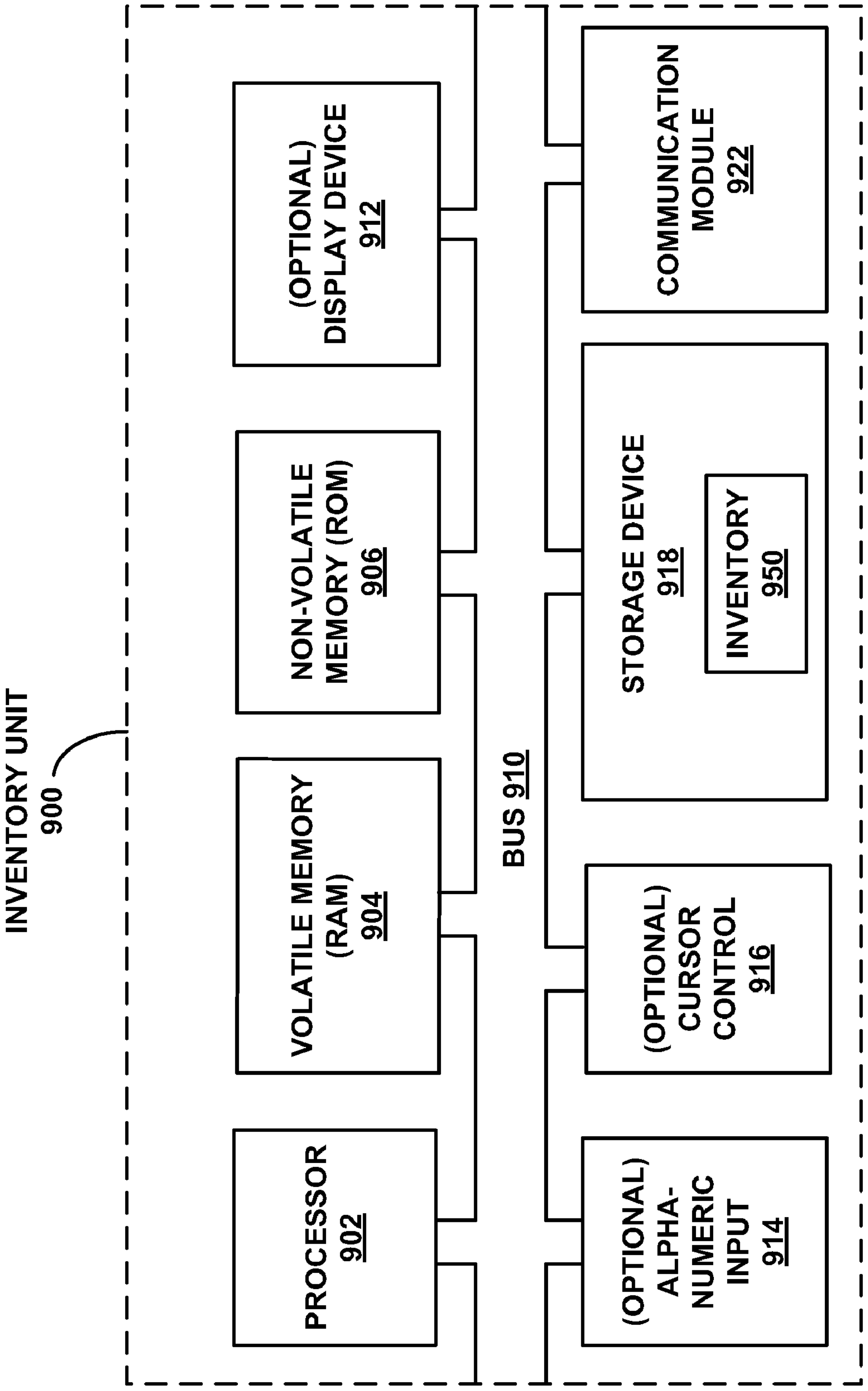
FIG. 9 is a block diagram of an example inventory unit, in accordance with an embodiment.

FIG. 9 is a block diagram of an example inventory unit 900, in accordance with an embodiment. Inventory unit 900 of FIG. 9 comprises an address/data bus 910 for communicating information, one or more processors 902 coupled with bus 910 for processing information and instructions. Processor unit(s) 902 may be a microprocessor or any other type of processor. Inventory unit 900 also includes data storage features such as a computer usable volatile memory 904 (e.g., random access memory, static RAM, dynamic RAM, etc.) coupled with bus 910 for storing information and instructions for processor(s) 902, a computer usable non-volatile memory 906 (e.g., read only memory, programmable ROM, flash memory, EPROM, EEPROM, etc.) coupled with bus 910 for storing static information and instructions for processor(s) 902.

An optional display device 912 may be coupled with bus 910 of inventory unit 900 for displaying video and/or graphics. It should be appreciated that optional display device 912 may be a cathode ray tube (CRT), flat panel liquid crystal display (LCD), field emission display (FED), plasma display or any other display device suitable for displaying video and/or graphic images and alphanumeric characters recognizable to a user.

In one embodiment, after inventory unit 900 accesses a location and identity of a component, such as component 200, display device 912 displays the location and identity associated with component 200. This location and identity can be displayed in numerous fashions. For example, in one embodiment, the location and identity of component 200 can be as text information, such as in a spreadsheet. Consider an embodiment where inventory unit 900 accesses an identifier "Component_A" and a location of 37.189722°, −95.293611° associated with component 200. In one such embodiment, inventory unit 900 displays identifier "Component_A" and location 37.189722°, −95.293611° on display device 912 in association with component 200. In other embodiments, some or all information accessed regarding a component, such as component 200 is displayed in a more intuitive graphic format, such as with graphic representations of a component overlaid upon the component's location with respect to a map of a storage area, job site, manufacturing site, or the like.

Optionally, inventory unit 900 may include an alphanumeric input device 914 including alphanumeric and function keys coupled with bus 910 for communicating information and command selections to the processor(s) 902. Inventory unit 900 can include an optional cursor control or cursor directing device 916 coupled with bus 910 for communicating user input information and command selections to the processor(s) 902. The cursor directing device 916 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 914 using special keys and key sequence commands. Embodiments herein are also well suited to directing a cursor by other means such as, for example, voice commands.

Inventory unit 900 of FIG. 9 may also include one or more optional computer usable data storage devices 918 such as a computer-readable magnetic or optical disk (e.g., hard disk, floppy diskette, Compact Disc-Read Only Memory (CD-ROM), Digital Versatile Disc (DVD)) and disk drive coupled with bus 910 for storing information and/or computer executable instructions. In one embodiment, one or more storage devices 918 are utilized to store an inventory 950 which includes locations and associated identities of one or more construction equipment components, such as component 200 of FIG. 2. It is appreciated that a timestamp and or other information can be stored in inventory 950 in association with an identity of a component. Thus storage of information is not limited to just location information, and in some embodiments, may not include location information.

Inventory unit 900 also includes one or more communication interfaces as part of communication module 922. For example, communication module 922 may include a communication interfaces such as, but not limited to, a serial port, parallel port, Universal Serial Bus (USB), Ethernet port, antenna, or other input/output interface. Communication module 922 may electrically, optically, or wirelessly (e.g. via radio frequency) couple a computer system, such as inventory unit 900 with another device, such as a cellular telephone, radio, component monitor 300, component information unit 100, or other computer system. In one embodiment, communication module 922 comprises complementary communications mechanisms to those of a component monitor 300 with which it communicates.

Example Display of Component Information

Figure 10:
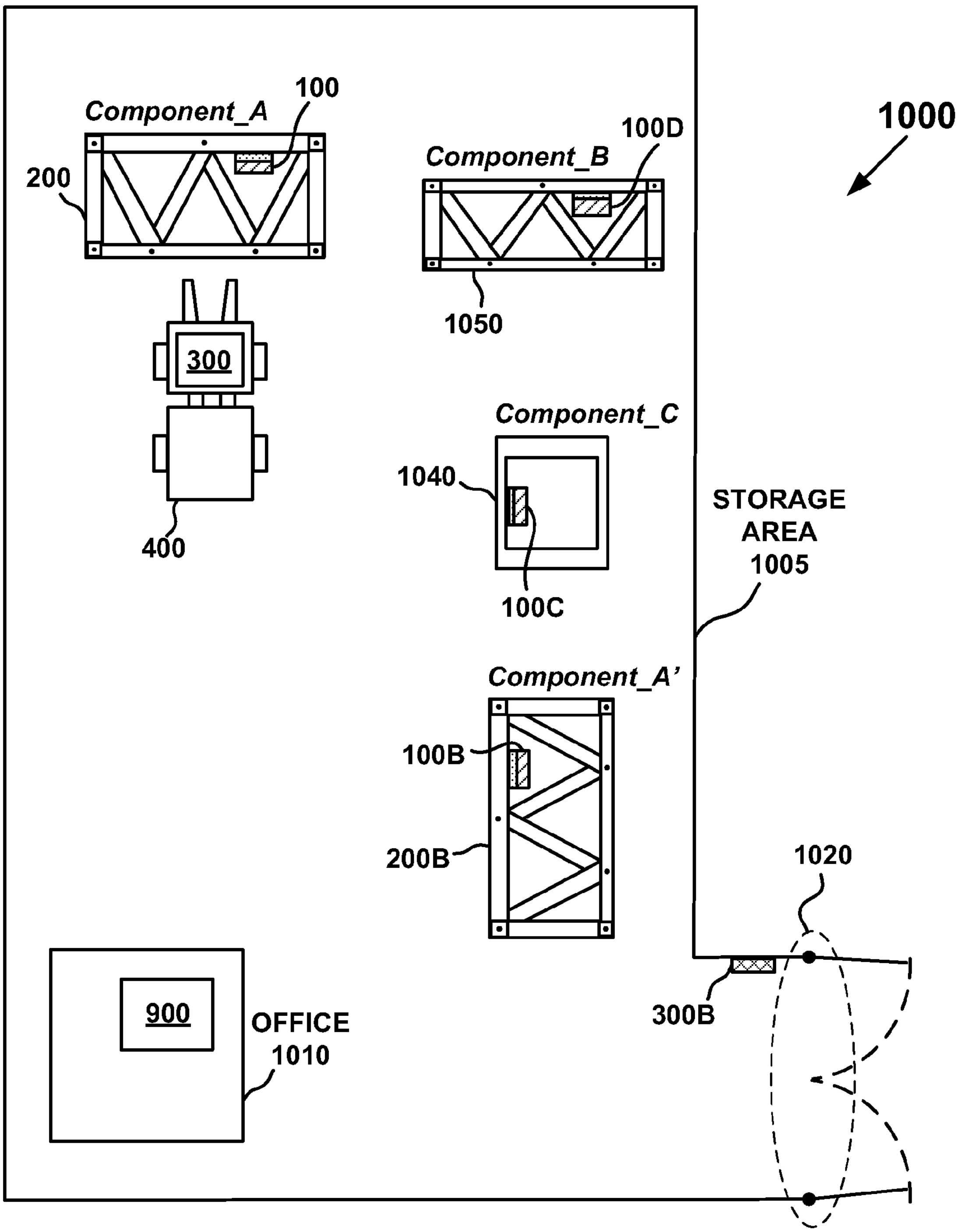
FIG. 10 shows a display of a component location and identity in relation to a map of a construction equipment component storage area, as displayed by an example inventory unit, in accordance with an embodiment.

FIG. 10 shows a display 1000 of a component location and identity in relation to a map of a construction equipment component storage area 1005, as displayed by inventory unit 900, in accordance with an embodiment. Display 1000 is one example of a display of inventory information from inventory 950, which can be displayed on display device 912 of inventory unit 900. It is appreciated that many variations are possible and anticipated, and that display 1000 is shown by way of example and not of limitation. In display 1000 locations and identities of components are shown in relation to a map/diagram of storage area 1005. The map like nature of display 1000 allows a user to intuitively visualize the location of a component within storage area 1005.

Display 1000 shows an office 1010 where inventory unit 900 resides. Forklift 400, which includes component monitor 300, is being used as an inventory positioning vehicle. Inventory unit 900 communicates with component monitor 300 via a wireless network (e.g., an 802.11 type network) which encompasses all or part of storage area 1005. A gate area 1020 serves as an entrance/exit to storage area 1005. A second component monitor 300B is positioned in gate area 1020 to facilitate wireless mesh network communications with component information units coupled with components which enter and exit storage area 1005.

Component 200 is shown mechanically coupled with component information unit 100. Consider an example where forklift 400 has just completed an inventory movement of component 200. Component monitor 300 has communicated with component information unit 100 via a wireless mesh network, to access an identity and/or location of component 200. Component monitor 300 has also communicated the location and identity of component 200 to inventory unit 900, via a separate wireless network. Inventory unit 900 utilizes this information to display the legend "Component_A" in the upper left corner of a map of storage area 1005 in association with a graphical representation of component 200 and its location with in storage area 1005.

As shown in FIG. 10, a variety of other components are stored in storage area 1005. Component 1040 is coupled with component information unit 100C. The location of component 1040 is shown by a graphical display of component 1040 in conjunction with the legend "Component_C" which has been derived from the identifier of component 1040. Component 1050 is coupled with component information unit 100D. The location of component 1050 is shown by a graphical display of component 1050 in conjunction with the legend "Component_B" which has been derived from the identifier of component 1050. Component 200B is coupled with component information unit 100B. The location of component 200B is shown by a graphical display of component 1050 in conjunction with the legend "Component_A'" which has been derived from the identifier of component 200B. For purposes of this example, component 200B is a modular component which is identical to component 200. As shown, unique identifiers allow for independent location and inventory tracking of components 200 and 200B even though they may outwardly appear to be identical to one another.

Example System for Construction Equipment Component Location Tracking

Figure 11:
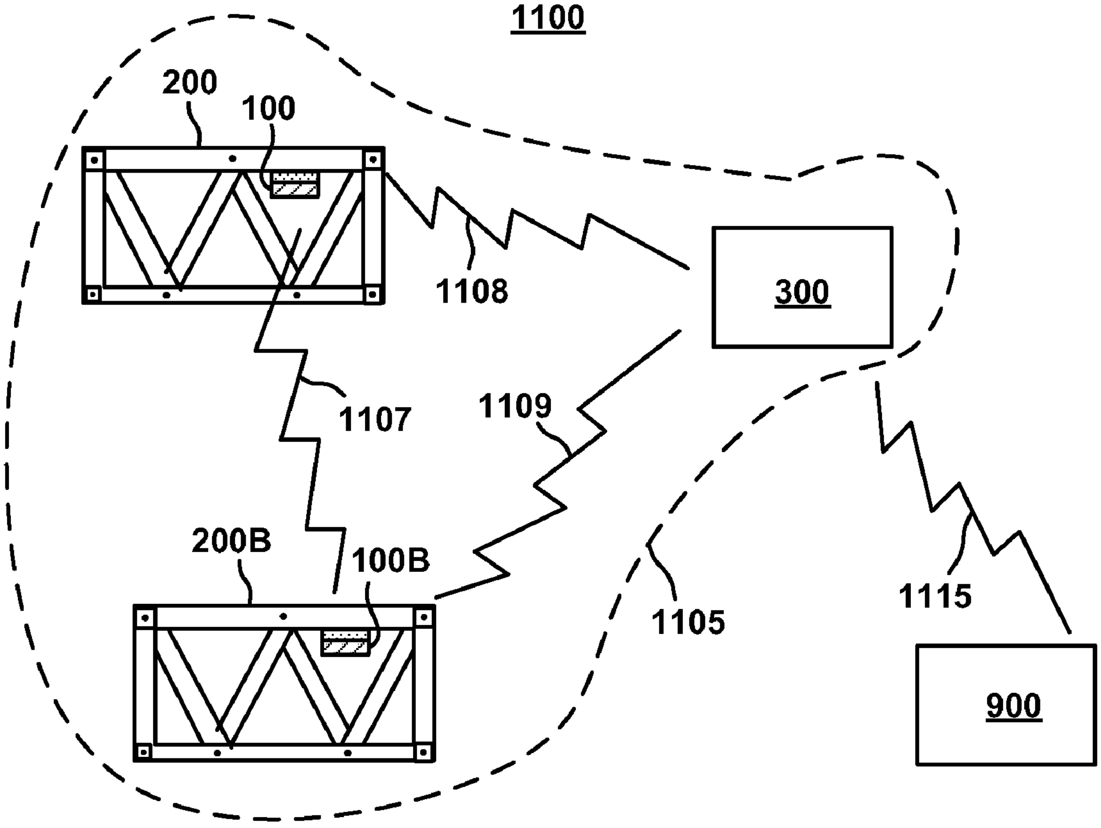
FIG. 11 is block diagram of a construction equipment component tracking system, in accordance with an embodiment.

FIG. 11 is block diagram of a construction equipment component tracking system 1100, in accordance with an embodiment. System 1100 is comprised of at least one component information unit 100, at least one component monitor 300, and an inventory unit 900. Another example of such a component tracking system is illustrated in display 1000 FIG. 10. Component information unit 100 is mechanically coupled with a component 200 and provides an identity of component 200 to component monitor 300 via a wireless mesh network communication between component information unit 100 and component monitor 300. A second component 200B is shown mechanically coupled with component information unit 100B.

Component monitor 300 is physically separate from the component with which component information unit 100 is coupled (e.g., not mechanically coupled with either component 200 or with component information unit 100). A wireless mesh network 1105 is comprised of one or more of wireless mesh network communication 1107 (between component 200 and component 200B), mesh network communication 1108 (between component 200 and component monitor 300), and mesh network communication 1109 (between component 200B and component monitor 300).

Component monitor 300 receives the identity (e.g., Component_A) of component 200, during a wireless mesh network communication with component information unit 100. Component monitor 300 also notes and stores a location of the component 200 at a completion of an inventory action involving the component. This noting and storing of the location of component 200 can be accomplished by accessing the location from component information unit 100 or via accessing and storing the location as indicated by GNSS receiver 320.

In some embodiments, component monitor 300 is physically coupled with an inventory positioning vehicle, such as, for example forklift 400 of FIG. 4. By physically coupled, what is meant is that component monitor is located on or within forklift 400, and in some embodiments is mechanically coupled with a portion of forklift 400. In some embodiments, component monitor 300 is coupled with a vehicle, such as, for example truck 500, which is used to transport construction equipment components between a component storage area and a job site. In one embodiment, as illustrated by display 1000 a component monitor (e.g., component monitor 300B) is positioned proximal to a gate or other access point of a component storage area. In other embodiments, component monitor 300 is coupled with a cab of a crane, such as crane cab 610 shown in FIG. 6. In one embodiment, as shown in FIG. 7, component monitor 300 is configured within a hand-holdable portable device, such as hand-holdable portable device 700.

Inventory unit 900 accesses the location and identity of a component (e.g., component 200) via a communication 1115 between inventory unit 900 and component monitor 300. In one embodiment, communication 1115 is a not a wireless mesh network communication, but is instead another form of wireless communication, several examples of which are described herein. Inventory unit 900 associates the location and identity of the component (e.g. component 200) with a timestamp in an inventory (e.g., inventory 950) of components. Inventory 950 can comprise a spreadsheet, database, or other form of inventory data structure which is maintained on storage device 918. In one embodiment inventory unit 900 includes or is coupled with a display device 912 for providing a display (e.g. display 1000) including the location and the identity of the component (e.g., component 200) and/or other components relative to a map of a component storage area or some other area such as a job site.

Figure 12:
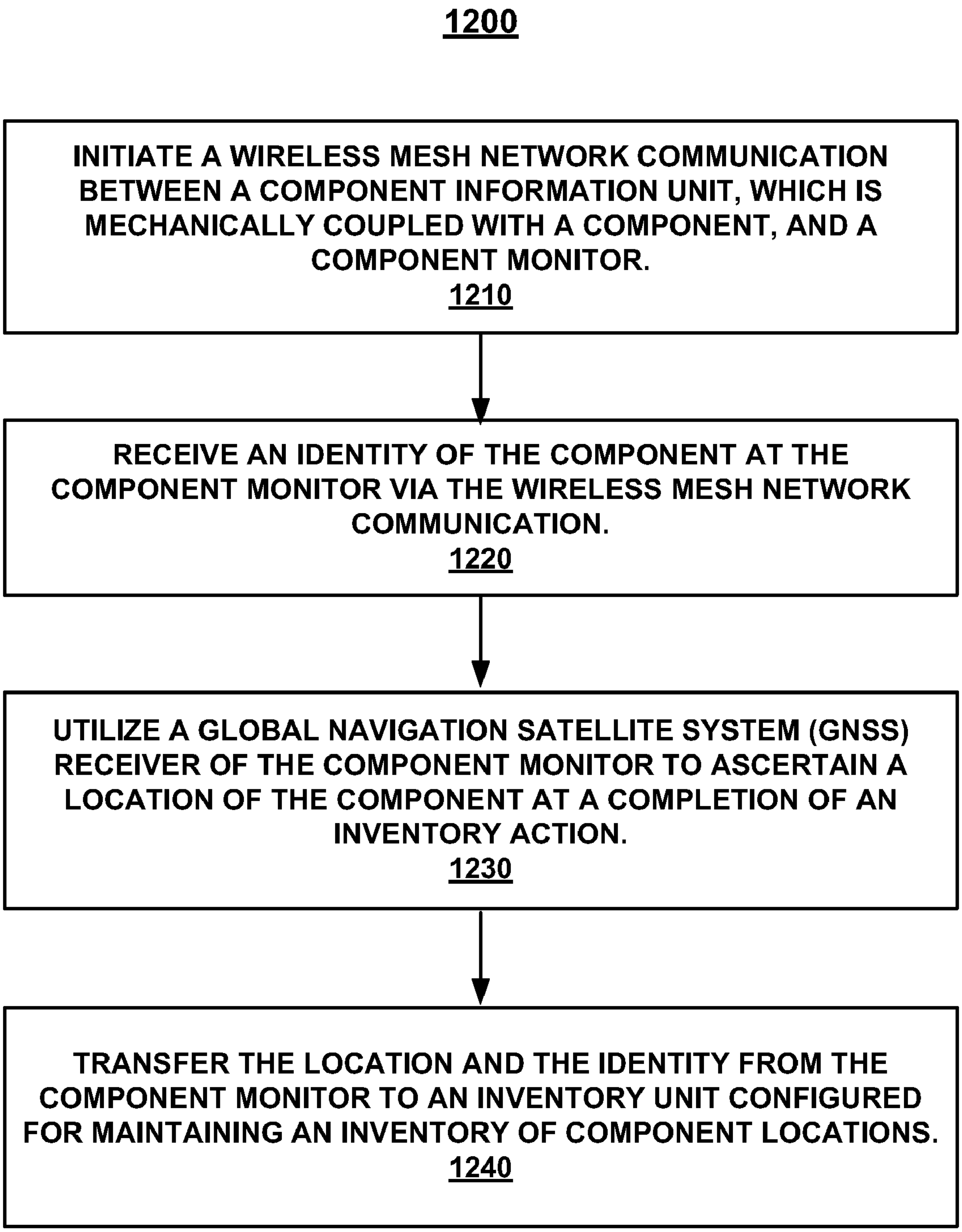
FIG. 12 is a flow diagram of an example method for construction equipment component tracking, in accordance with an embodiment.

Example Method of Component Location Tracking with a Component Tracking System With reference to FIG. 12, flow diagram 1200 illustrates example operations used by various embodiments. Flow diagram 1200 includes processes and operations that, in various embodiments, are carried out by a processor under the control of computer-readable and computer-executable instructions. The computer-readable and computer-executable instructions reside, for example, in data storage features such as volatile memory, non-volatile memory, and/or storage modules/devices associated with component information unit 100, component monitor 300, and/or inventory unit 900. The computer-readable and computer-executable instructions can also reside on computer readable media such as a hard disk drive, floppy disk, magnetic tape, Compact Disc, Digital Versatile Disc, and the like. The computer-readable and computer-executable instructions, which may reside on computer readable media, are used to control or operate in conjunction with, for example, component information unit 100, component monitor 300, and/or inventory unit 900.

FIG. 12 is a flow diagram 1200 of an example method for construction equipment component location tracking, in accordance with an embodiment. Reference will be made to FIGS. 1, 2, 3, 4, 9, 10, and 11 to facilitate the explanation of the operations of the method of flow diagram 1200. By way of example, and not of limitation, the method of flow diagram 1200 will be described as being performed using all or some portion of component tracking system 1100, which is illustrated in FIG. 11.

At operation 1210, in one embodiment, a wireless mesh network communication is initiated between a component information unit and a component monitor. For example, while component information unit 100 is mechanically coupled with component 200, this communication can be initiated between component information unit 100 and component monitor 300. The instigator/initiator of the communication can be component information unit 100, component monitor 300, or a mesh network node coupled between component information unit 100 and component monitor 300 (e.g., component information unit 100B of mesh network 1105.

At operation 1220, in one embodiment, an identity of the component (e.g., component 200) is received at the component monitor via the wireless mesh network communication. For example, the identity "Component_A" of component 200 is received at component monitor 300 via wireless mesh network communication over wireless mesh network 1105.

At operation 1230, in one embodiment, Global Navigation Satellite System (GNSS) receiver 320 of component monitor 300 is utilized to ascertain a location of component 200 at a completion of an inventory action involving component 200. Consider an embodiment where the ascertained location is 37.189722°, −95.293611°. This location (37.189722°, −95.293611°) is then stored in storage module 330 in association with the identity of component 200.

At operation 1240, in one embodiment, the location and the identity of the component (e.g., component 200) are transferred from the component monitor to an inventory unit which maintains an inventory of component locations. For example, this can comprise transferring the location (37.189722°, −95.293611°) and the associated component identity (Component_A) from component monitor 300 to inventory unit 900 via wireless communication 1115. At inventory unit 900, in one embodiment, a timestamp such as date time group (e.g., 2008__07__19__1359) is associated with the location (37.189722°, −95.293611°) and with the identity (Component_A) in inventory 950 inventory. It is appreciated that a chronological list of locations and/or other information related to a component (or plurality of components) can be maintained in inventory 950. In one embodiment, the location and the identity of component 200 are displayed on a display device 912 coupled with inventory unit 900. As described herein, such a display can take many forms. For example, in one embodiment, the location and identity of component 200 can be displayed, such as in display 1000, relative to a map of a component storage area or other location.

Example Data Mule

In one embodiment, component monitor 300 is coupled with (e.g. located on or within or mechanically coupled by a mechanically coupling means described herein or other similar means) an inventory positioning vehicle (e.g., forklift 400, truck 500, trailer 550, crane 600, or other inventory positioning vehicle such as a loader) to create a data mule. Component monitor 300 of the data mule communicates with component information unit 100 and transfers or accesses information regarding a component, such an identity and/or location of component 200. The combination of component monitor 300 and forklift 400, as shown in FIG. 10, constitutes one embodiment of a data mule. Consider an example illustrated by FIG. 10, where component monitor 300 is in communication with component information unit 100. Information regarding component 200 can be accessed and/or transferred to component monitor 300. Additionally, information regarding other components (which is stored in component information unit 100) can also be accessed and/or transferred to component monitor 300.

The data mule is typically used in large areas, such as component storage areas like storage area 1005, to provide a means for moving/bridging component information (e.g., identity and location) to another network or device. Among other environments, a data mule can be useful in an environment where, for example, an 802.11 type wireless network does not provide coverage to an entire storage area. When an inventory positioning vehicle (400, 500, 600, or the like) performs an inventory movement of component 200, component monitor 300 communicates a wireless mesh network with component information unit 100. Upon completion of the inventory movement, component monitor 300 stores the inventory location and identity of component 200. This inventory location and identity are stored in component monitor 300 at least until communication module 350 is able to establish a bridge communication to another network or device and transfer the location and the identity to inventory unit 900.

In some embodiments, such communication with inventory unit 900 or a communication network (e.g., a local area network, wide area network, or the internet) may be immediate or on demand, such that the location and identity can essentially be streamed out on the network or to inventory unit 900 as they are accessed/noted. In other embodiments, component monitor 300 associated with the inventory positioning vehicle (400, 500, 600, or the like) being used as a data mule may need to store the information until a future time at which it enters communication range of inventory unit 900 or a communications network, at which point the location and identity information are then provided to or accessed by inventory unit 900. It is appreciated that other information regarding component 200 may also be accessed by inventory unit 900 via component monitor 300 in a similar manner.

In another embodiment, a data mule works in a reverse fashion from the above description to bridge a communication from inventory unit 900 or a communication network to one or more component information units (e.g., component information unit 100). This may require that the inventory positioning vehicle (400, 500, 600) be driven into mesh network communication range with a component information unit 100, before a communication can be bridged to component information unit 100.

It is appreciated that, in a similar manner, a component monitor 300 configured within a hand-holdable portable device 700 can be used in data mule like fashion by transporting it from place to place to access information from a component information unit 100 and bridge information to and from component information unit 100 and other communication networks and/or inventory unit 900.

SECTION 3

Monitoring Crane Component Overstress

An overstress condition is a stress condition which can occur when a crane performs a lift which is beyond is rated capacity, when a crane component is stressed beyond its rated capability, or when a crane component is operated in an unauthorized fashion. Often combinations of such conditions may occur simultaneously. As used within Section 3, the term "crane component" refers to a crane component which bears or experiences load or stress during the lifting of a load by a crane. Some non-limiting examples of the types of crane components which are being referred to by the term "crane component" include: a boom component, a hydraulic boom or section thereof, a jib component, a counter-jib component, a trolley component, a load hook component, a tower component, a gantry component, a cantilever component, an outrigger component, a boom tip, and a cat head component.

Overstress conditions can often cause damage to crane components. However, it is appreciated that a number of factors can be pertinent to understanding the likelihood of damage to a crane component as a result of experiencing an overstress conditions. One example of a factor which is pertinent in some circumstances is the temperature (either the ambient temperature or the temperature of a crane component) during the overstress condition. Temperature can be pertinent if the strength or operating envelope of a crane component varies with temperature experienced by a crane component. Another example of a factor which is pertinent in some circumstances is the number of cycles that a crane component has been operated at near (e.g. within 10%) or beyond a rated lift capacity or stress. Damage to the crane component or failure to the crane component can increase in likelihood as a crane component experiences increased cycles near or beyond a rated capacity or stress capability. Thus, in some situations, a log of overstress events can be useful, as can information which characterizes the amount of stress experienced or the temperature at which an overstress occurred.

Apparatus for Monitoring Overstress Conditions Experienced by a Crane Component In various embodiments, a component information unit, such as component information unit 100, is an apparatus for monitoring overstress conditions or crane components. In other embodiments, component information unit 100 is one portion of a system for monitoring overstress conditions experienced by a crane component. As an apparatus, component information unit 100 independently measures and stores records of overstress conditions experienced by a crane component. As part of a system, component information unit 100 operates cooperatively to record and/or measure overstress conditions experienced by a crane component. Description of one such apparatus for monitoring crane component overstress is made with reference to FIG. 1, FIG. 2, and FIG. 13 and the previous description of operation of component information unit 100.

Figure 13:
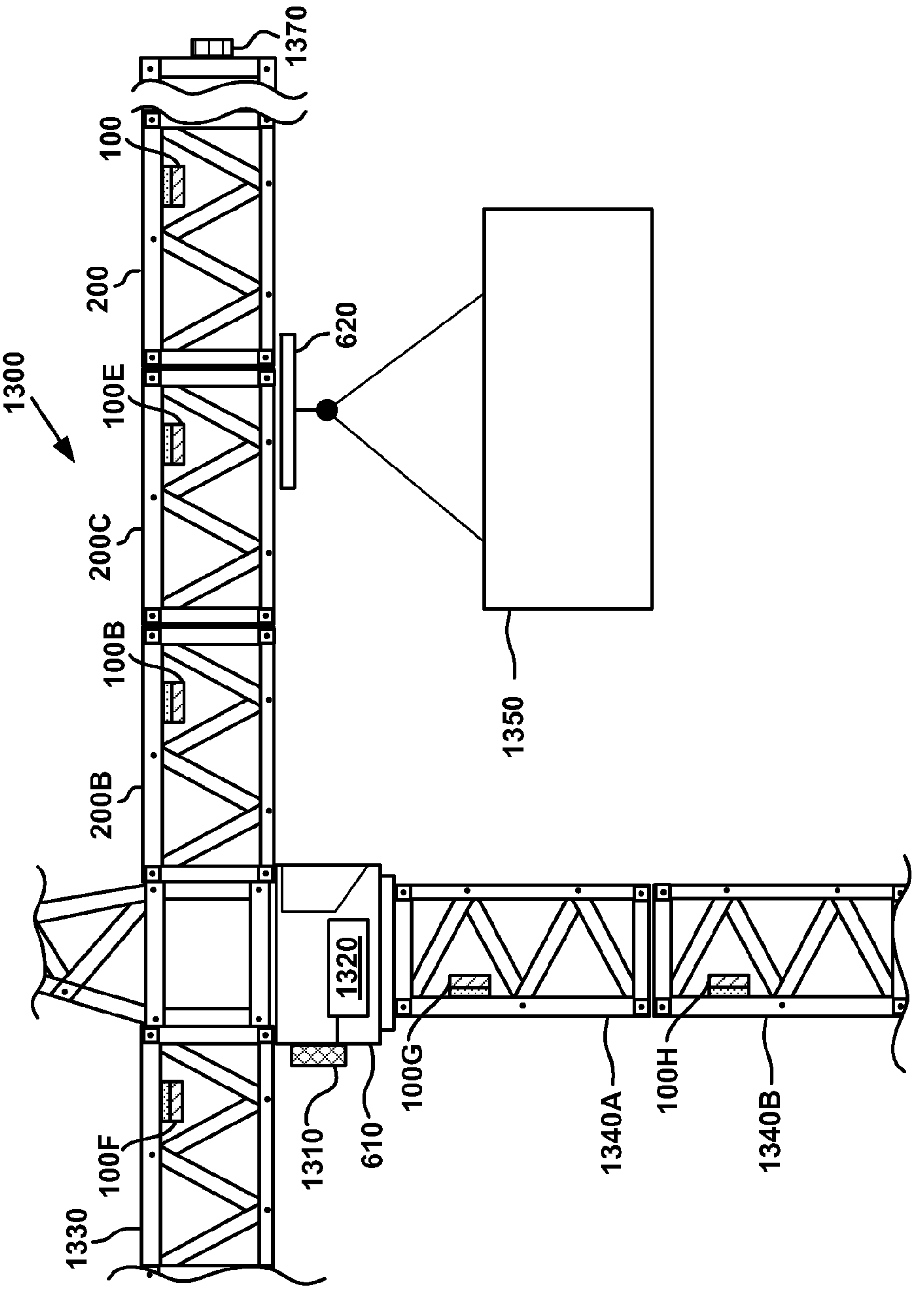
FIG. 13 shows a component monitor coupled with a crane and component information units coupled with components of the crane, in accordance with an embodiment.

FIG. 13 shows a component monitor coupled with a tower crane 1300 and component information units coupled with components of the crane, in accordance with an embodiment. Like figure number in FIG. 13 are identical to those shown and described in conjunction with tower crane 600 of FIG. 6. Tower crane 1300 differs from tower crane 600 in that it includes, in one embodiment, a component monitor 1310 which is communicatively coupled with load sensor 1320 of tower crane 1300. In some embodiments component monitor 1310 is coupled to other information sources within tower crane 1300, such as, for example a machine hours counter associated with tower crane 1300. Tower crane 1300 also includes crane component 200 as an assembled component of tower crane 1300. Tower crane 1300 is shown lifting load 1350, which in one embodiment causes an overstress condition to occur with tower crane 1300 and/or a crane component, such as crane component 200. Tower crane 1300 is shown by way of example and not of limitation. It is appreciated that the subject matter described herein is applicable to a variety of cranes and crane components and is not limited to tower cranes and tower crane components.

It is appreciated that in one embodiment a tip position device, such as tip position device 1370, comprising a GNSS receiver and a wireless mesh network transmitter or transceiver can be positioned on a distal end of the jib, the anti-jib, or both of tower crane 1300. Such a tip position device can be positioned on one or both ends of a boom or span of a crane. In such embodiments, crane cab 610 is located on or represents the proximal end of the jib and the anti-jib. In some embodiments, such a tip position device is also mounted on the proximal end of the jib, anti jib, or both. The transceiver of the tip position device transmits a three-dimensional position of the component tip to which it is mounted, this position is derived from the GNSS receiver of the tip position device. Thus, in one embodiment in a boom crane, such a tip position device transmits the position of the boom tip on which it is mounted. In a tower crane such as tower crane 1300, such a tip position device transmits the position of the tip of the jib, the anti-jib, or both (if each the jib and anti-jib included such a device). The location in various embodiments is transmitted substantially continuously, at intervals, and/or in response to a request, such as a request from component monitor 1310. In one embodiment, such a device may be the same as or similar to component monitor 1310.

Consider an embodiment where such tip position device 1370 is mounted on the distal end of the jib of tower crane 1300. A baseline position can be measured and recorded relative the position of the proximal end of the jib (relative to a position from a tip position device located on the proximal end of the jib) or relative to the position of component monitor 1310 (as supplied by the GNSS receiver of component monitor 1310). During operation of tower crane 1300, the overall flexing of the jib of tower crane 1300 can be continually measured. This would include cumulative flexing spread across a plurality of assembled components of the jib, such as component 200, component 200B, and component 200C. Such flexing or deflection can be horizontal, vertical, or both, and can be due to forces such as movement, load induced stress, or wind (among others).

Referring again to FIG. 1, strain gauge 143 is mechanically coupleable with a structural element of a crane component for measuring mechanical flexing of the crane component. With reference to FIG. 2, in one example, strain gauge 143 is coupled via a mechanical coupled (e.g., via an adhesive or epoxy) to structural element 207 of crane component 200. It is appreciated that mechanical coupling 205 can simultaneously couple strain gauge 143 and component information unit 100 to crane component 200, in some embodiments. With reference again to FIG. 13, component information units 100B, 100E, 100F, 100G, and 100H are similar or identical to component information unit 100 and each include a strain gauge such as strain gauge 143. Component information units 100B, 100E, 100F, 100G, and 100H and their respective strain gauges are mechanically coupled in similar fashion respectively to crane components 200B, 200C, 1330, 1340A, and 1340B of tower crane 1300.

Sensor module 140 is communicatively coupled with strain gauge 143. Sensor module 140 accesses a measurement of strain gauge 143 (such as a voltage or resistance) to sense stress conditions experienced by crane component 200 and determine an occurrence of an overstress condition. This accessing can comprise receiving or acquiring a measurement from strain gauge 143. Sensor module 140 interprets the accessed measurement to determine if an overstress condition has been experienced by a crane component. For example, in one embodiment, the interpretation comprises sensor module 140 comparing the accessed measurement to a predefined measurement value or range which is associated with an acceptable stress value for a component and/or with a maximum lift in which a component is authorized to participate. In one embodiment, in conjunction with the creation of a timefence (described further below), the threshold may be varied based upon a time and/or date. Similarly, in one embodiment the threshold may be varied according to a measured temperature accessed from temperature sensor 141. Such temperature variance can be based on temperature based changes in a mechanical operating envelope of a component as specified by a manufacturer, inspector, or other authority.

In one embodiment, when sensor module 140 determines that the measurement exceeds or otherwise violates the threshold, sensor module 140 notes that an overstress situation has occurred. It is appreciated that sensor module 140 can access measurements from strain gauge 143 at periodic intervals, in response to triggering events (such as sensing movement with motion sensor 142), and/or in response to receiving a wireless signal (e.g. a signal indicative of an overstress condition).

When an overstress condition is noted by sensor module 140, storage module 130 is communicatively coupled with sensor module 140. Storage module 130 stores a record of an overstress condition. Continuing the above example, in one embodiment, such a record can be as basic as storing a bit or flag to indicate that crane component 200 has experienced an overstress condition. In some embodiments, the record comprises a log of overstress conditions, which catalogs occurrences of overstress conditions. In some embodiments, all or part of the record is stored in a portion of storage module 130 which comprises a tamper resistant memory. Such tamper resistance can be achieved in a variety of ways, such as by including a portion of memory which can be written to but not erased (or not easily erased) and/or by providing password protection or firewall protection which prevents or reduces the possibility of an entity external to component information unit 100 erasing or altering information stored in the record.

TABLE 1

| Example Information in an Overstress Record |
|---|
| Component Identity: Component_A |
| Component Type: Crane Jib Component |
| Overstress Type: Mechanical |
| Timestamp: 30 January 2005/13:10 GMT |
| Location During Overstress: 37.818775°, −122.478414° |
| Horizontal Jib Deflection: 2 Meters |
| Vertical Jib Deflection: 3.5 Meters |
| Total Hours of Component Operation at Time of Overstress: 1,977.20 |
| Component Operating Hours Since Last Inspection: 120 |
| Elapsed Time Since Last Component Inspection: 19 days, 0 Hours, 10 minutes |
| Time of Last Inspection: 11 January 2005/13:00 GMT |
| Temperature During Overstress: 25° Celsius |
| Geo-fence Violation: No |
| Time-fence Violation: No |

A variety of information can be stored in the overstress record including, for example: a timestamp related to the occurrence of the overstress condition; a location (e.g., latitude and longitude) relative to where the overstress condition occurred; a representation of a measurement from strain gauge 143 relative to occurrence of the overstress condition; and temperature relative to the occurrence of the overstress condition. A timestamp, such as a date time group, can be supplied by a clock which is a portion of component information unit 100, or via communicating with an entity external to component information unit 100. A location can be accessed, in the manner described above, from a source outside of component information unit 100. A temperature can be accessed from temperature sensor 141. In one embodiment, an overstress record can include a tally of the machine hours of use of the crane as indicated by a machine hours counter located, for example, in crane cab 610 of tower crane 1300. In one embodiment, such machine hours of use can be supplied by component monitor 1310 or accessed via component monitor 1310. In one embodiment the total hours of use of a component can be tracked at a component level, such as by accumulating the time periods during which strain gauge 143 measured a strain which exceeded a minimum threshold associated with operational use of the component to which a component information unit 100 is coupled. A time since last inspection can be calculated from a stored time of inspection which is stored in component information unit 100 following an inspection may an inspector or other entity such as a crane maintainer, renter, owner, or operator. Table 1 shows one example of information stored in an overstress record for crane component 200. It is appreciated that, in other embodiments, different information, less information, or additional information can be included in an overstress record.

Mesh network device 110 is communicatively coupled with storage module 130. In one embodiment, mesh network device 110 provides information from the overstress record to an outside entity (e.g., to a component monitor 300) via a wireless mesh network communication. Providing information from the record can comprise providing all or a portion of the information stored in an overstress record. This facilitates monitoring of occurrence of overstress conditions experienced by crane component 200. In one embodiment, the information provided from the record is provided in conjunction with an identifier associated with crane component 200 (e.g., an identifier supplied by identification module 120).

Consider an example where a crane inspector or storage yard worker interfaces with crane component 200 utilizing a component monitor 300 configured as hand-holdable portable component monitor 700 (FIG. 7). In such an example, mesh network device 110 wirelessly communicates information from the overstress record to provide the information in response to a request received from hand-holdable portable component monitor 700.

Consider another example where, during an inventory movement of crane component 200, a wireless mesh network communication is initiated between component information unit 100 and a component monitor 300 (e.g., component monitor 300 of FIG. 4) which is coupled with forklift 400. Mesh network device 110 can automatically or responsively provide information from the overstress record via the wireless mesh network communication with component monitor 300. Information provided from the overstress record can then be up-channeled from component monitor 300 to inventory unit 900 and used to determine a disposition of crane component 200, such as whether maintenance, inspection, or removal from use is in order.

System for Monitoring Overstress Conditions Experienced by a Crane Component In some embodiments, component information unit 100 is a portion of a system for monitoring overstress conditions experienced by a crane component. One such system is shown in FIG. 13, and includes component information unit 100 and a component monitor, such as component monitor 1310, which can be communicatively coupled with a load sensor (e.g., a load sensor, load indicator, or the like) of a crane.

With reference to FIG. 13, component monitor 1310 is shown communicatively coupled with load sensor 1320 of tower crane 1300. Component monitor 1310 is similar to the previously discussed component monitor 300 (FIG. 3) except that it is additionally configured for sensing stress conditions experienced by a crane and that it is configured for wirelessly transmitting an "overstress signal" that indicates a sensed occurrence of an overstress condition experienced by a crane to which it is coupled.

Figure 14:
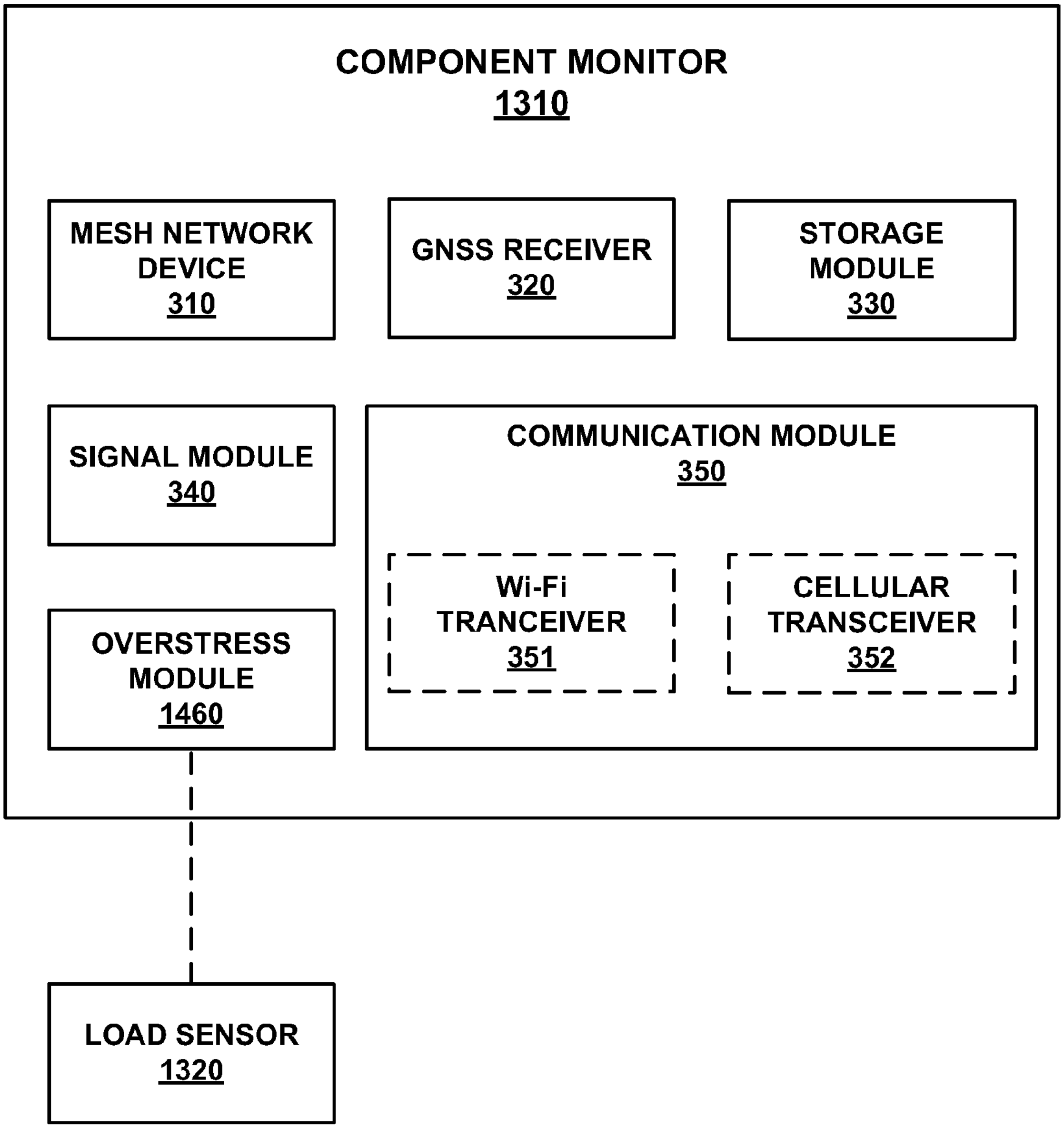
FIG. 14 is a block diagram of an example component monitor, in accordance with an embodiment.

FIG. 14 shows a block diagram of an example component monitor 1310, in accordance with an embodiment. Like element numbers in FIG. 14 are the same as those of component monitor 300 (FIG. 3), and reference is made to previous description of such elements. Component monitor 1310 differs from component monitor 300 in that it includes an overstress module 1460 which can be communicatively coupled with a load sensor (e.g. load sensor 1320) of a crane for observing load induced stress conditions experienced during operation of the crane. In one embodiment, overstress module 1460 is also communicatively coupled with a tip position device, such as tip position device 1370, located on an end of the jib of crane 1300 which is distal from crane cab 610. Such coupling can allow for sensing/measurement an overall flexing or deflection of a jib, anti jib, or the like. In one embodiment overstress module 1460 compares a measured deflection with a baseline to determine if an overstress deflection threshold has been exceeded (e.g., exceeding a pre-defined distance in a horizontal or vertical direction from a baseline relationship).

Overstress module 1460, when coupled with load sensor 1320, observes load induced stress conditions experienced during operation of a crane. In one embodiment, this comprises monitoring for lifting of an excess load which exceeds a predefined or authorized load lifting capability for tower crane 1300. The predefined load lifting capability can be defined in numerous ways. For example, in one embodiment, the predefined load lifting capability can be a load which will likely cause damage to or failure of tower crane 1300 or one of its constituent components. Such a value may vary based upon configuration of tower crane 1300, and is often specified by a manufacturer, inspector, professional engineer, or some other authority.

Alternatively and/or additionally, in some embodiments, the predefined load lifting capability is defined as an authorized time/date and/or location of lift. Such authorization and can be based upon rental information which specifies time of day of authorized lifting, date or date range of authorized lifting, and/or location(s) of authorized or excluded lifting. Such authorized lift information can be pre-programmed as "time-fences" and/or "geo-fences" in overstress module 1460, such as, for example, by a rental company upon rental of tower crane 1300. This is useful for rental yards, as customers often rent cranes for a particular location or time of use and try to utilize the crane at other non-authorized locations and/or in excess of the paid rental time for the crane. It is appreciated that such pre-programming of time-fences and/or geo-fences is also a useful mechanism for companies, inspectors, or government agencies to create triggers for alerting to unauthorized use.

Consider an example of a time-fence. For purposes of this example, tower crane 1300 is rented for use on a Thursday and Friday with a return date of Monday morning. A time-fence bounding the time period of authorized lifts would be preset to authorize lifts occurring on Thursday or Friday. However, any lift which occurred on a Saturday, Sunday, or Monday and exceeded some minimal load would violate the preset time-fence and be viewed as an excess load which was not contracted or authorized for tower crane 1300. Following this example, overstress module 1460 indicates that an overstress condition occurs when it senses a use of tower crane 1300 to perform non-contracted/non-authorized lift activities on Saturday, in violation of the time-fence.

Consider an example of a geo-fence. Authorized and/or banned lift locations can be preset within component monitor 1310, such as, for example, in conjunction with a rental contract. For example, a geo-fenced area of authorized use to be can defined to be an area which geographically bounds a location of a job site which is specified as authorized in a rental contract. The coordinates of this authorized geo-fenced area are stored within overstress module 1460. In such an embodiment where one or more authorized lift locations are preset, overstress module 1460 communicates with GNSS receiver 320 to determine if a lift occurs outside of the preset authorized lift location (or similarly within an banned lifting area). Overstress module 1460 indicates that an overstress condition has occurred if it senses a use of tower crane 1300 to perform a lift outside of an authorized lift location.

With reference to FIGS. 13 and 14, signal module 340 is communicatively coupled with overstress module 1460. In one embodiment, signal module 340 generates an overstress signal in response to an overstress condition being observed by overstress module 1460.

Mesh network device 310 is communicatively coupled with signal module 340 and wirelessly transmits the overstress signal onto a wireless mesh network. With reference to example tower crane 1300, the overstress signal is received by component information units 100, 100B, 100E, 100F, 100G, 100H, and the like, which are communicating on a common wireless mesh network with component monitor 1310. In some embodiments, the overstress signal may be routed through a component information unit (e.g., 100E) before being received by another component information unit (e.g. 100). An example of mesh network communication is shown in mesh network 1105 of FIG. 11. In some embodiments, the overstress signal is addressed to a particular component (e.g., component 200 or component information unit 100); to a class of components (e.g., jib components 200, 200B, and 200C); or to some other list of components (such as all components of tower crane 1300).

In one embodiment, the overstress signal comprises an indication that an overstress condition has occurred. In other embodiments, the overstress signal can comprise additional information and/or descriptors including: an instruction to perform additional actions upon receipt of the overstress signal (e.g., measure a temperature or stress at the component location); a timestamp associated with the occurrence of the overstress condition; an elapsed crane operation/use time or component use/operation time (e.g., machine hours or other time of use); an indication that a time-fence was violated; a location (e.g., a latitude and longitude) associated with the occurrence of the overstress condition; a deflection distance of a portion of a crane (e.g., deflection(s) of the boom, anti-boom, jib, or other span of a crane); an indication that a geo-fence was violated; and/or a quantification value which is associated with the overstress condition (e.g., a value of a weight lifted, a percentage value of an authorized lifting capacity, and/or a representation of a measurement of load sensor 1320).

In a similar fashion, in one embodiment, the same or similar overstress signal is additionally or alternatively transmitted via communication module 350 for receipt by an external entity such as a pager, a cellular phone, a computer, an email account, inventory unit 900 (FIG. 9), or other entity external to component monitor 1310. For example, in one embodiment, the overstress signal could be sent to a governmental crane inspector's email account, pager, or cellular phone to apprise the inspector of a potentially unsafe or unauthorized use condition involving tower crane 1300.

As described above, and with reference again to FIG. 13, component information unit 100 (100B, 100E, 100F, 100G, 100H, and the like) is mechanically coupled with a crane component 200 (200B, 200C, 1330, 1340A, 1340B, and the like) of tower crane 1300, of which the component constitutes an assembled part. Component information unit 100, for example, includes mesh network device 110 which participates in communication with component monitor 1310 via a wireless mesh network (as described herein). As such, in one embodiment, mesh network device 110 receives an overstress signal which is transmitted by component monitor 1310. In one embodiment, component information unit 100 stores a record of an overstress condition in a storage module (e.g. storage module 130) in response to component information unit 100 receiving an overstress signal from component monitor 1310. As previously described, in one embodiment, such a record can be as basic as storing a bit or flag to indicate that crane component 200 has experienced an overstress condition. In some embodiments, the record comprises a log of overstress conditions, which catalogs occurrences of overstress conditions. In some embodiments, all or part of the record is stored in a portion of storage module 130 which comprises a tamper resistant memory.

A variety of information can be stored in the overstress record including, for example: a timestamp related to the occurrence of the overstress condition; a location (e.g., latitude and longitude) relative to where the overstress condition occurred; the type of overstress (e.g., mechanical overstress, non-contracted lift time; non-contracted lift location; or some combination); time since inspection of a component; operating hours of a component; time of last inspection of a component; hours of use/operation of a crane or component; and deflection(s) of a portion or portions of a macro component (e.g., a jib or other span) of which a component such comprises an assembled portion. In one embodiment, via communication with sensor module 140, storage module 130 stores a record of an overstress condition which is supplemented by information specifically related to crane component 200 (as noted by sensor module 140). Some examples of such specific information include: a representation of a measurement from strain gauge 143 relative to occurrence of the overstress condition; and a representation of a measurement from temperature sensor 141 relative to occurrence of the overstress condition. In one embodiment, via communicative coupling with sensor module 140, storage module 130 stores a record of an overstress condition only when overstress of crane component 200 is also noted by sensor module 140. Reference is again made to Table 1, which shows one example of information included in an example overstress record.

Example Methods for Monitoring Crane Component Overstress

Figure 15:
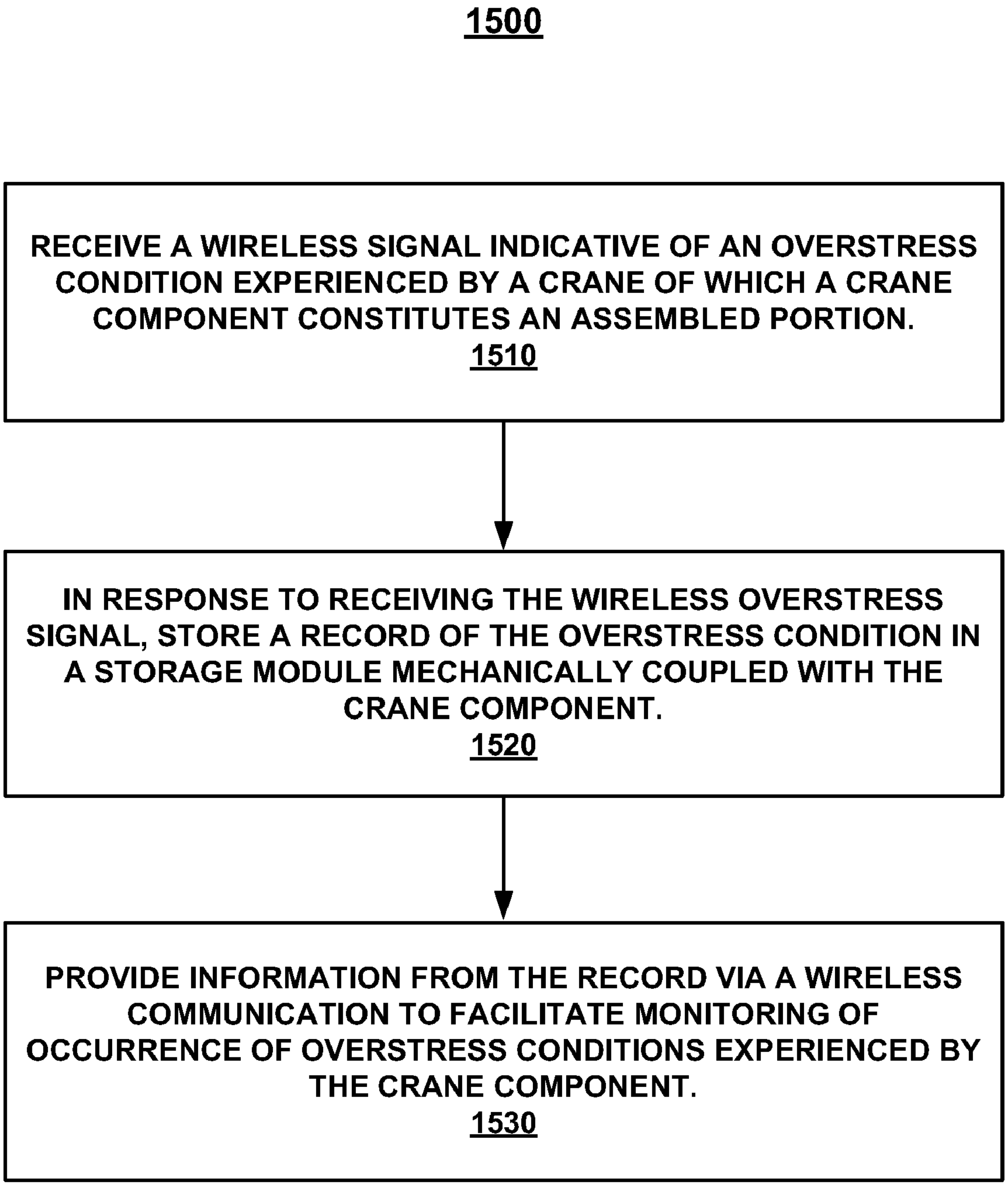
FIG. 15 is a flow diagram of an example method for monitoring overstress conditions experienced by a crane component, in accordance with an embodiment.
Figure 16:
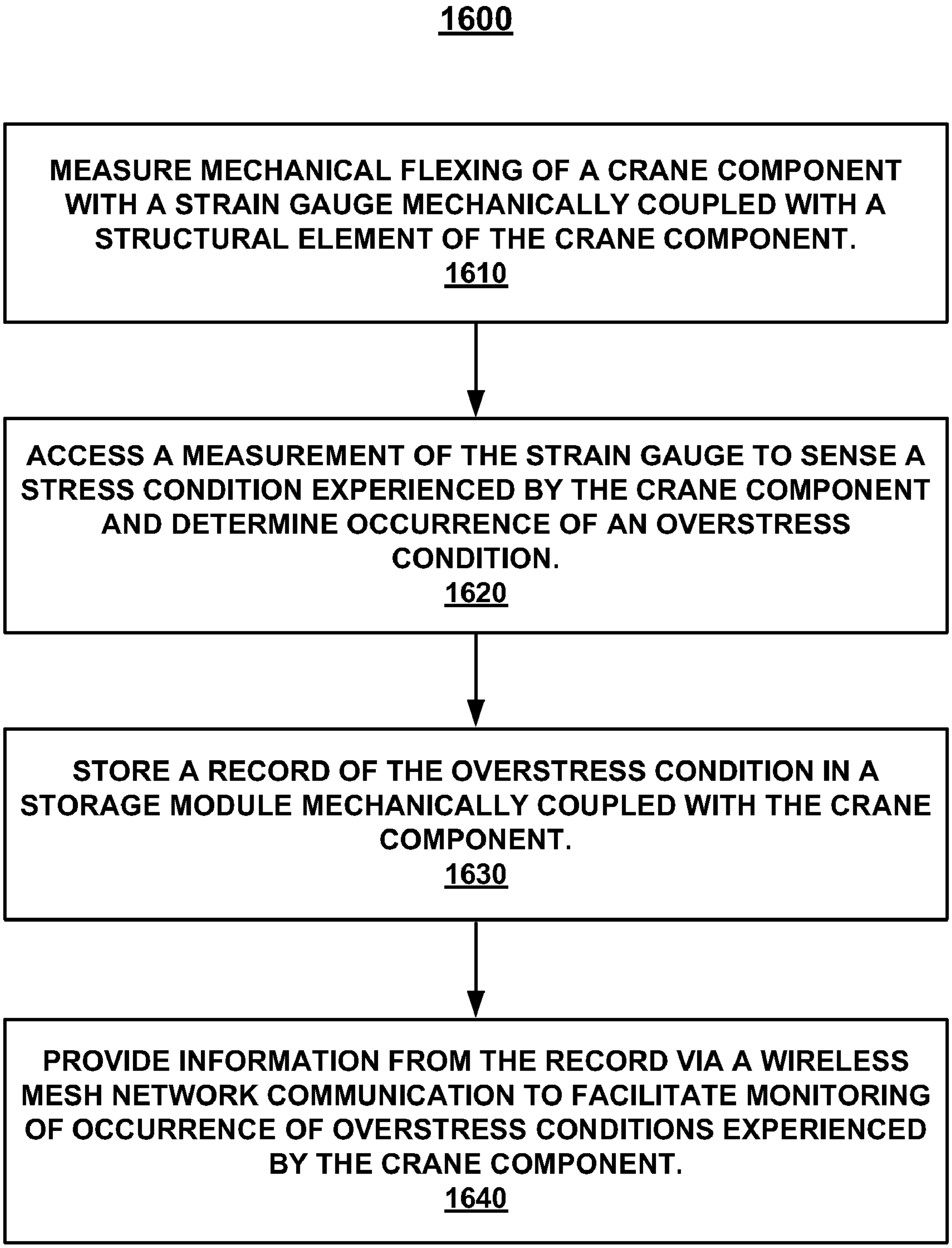
FIG. 16 is a flow diagram of an example method for monitoring overstress conditions at a crane component, in accordance with an embodiment.

With reference to FIGS. 15 and 16, flow diagrams 1500 and 1600 illustrate example operations and methods used by various embodiments. Flow diagrams 1500 and 1600 include processes and operations that, in various embodiments, are carried out by a processor under the control of computer-readable and computer-executable instructions. The computer-readable and computer-executable instructions reside, for example, in data storage features such as volatile memory, non-volatile memory, and/or storage module 130 (FIG. 1) and/or storage module 330 (FIGS. 3 and 13). The computer-readable and computer-executable instructions can also reside on computer readable media such as a hard disk drive, floppy disk, magnetic tape, Compact Disc, Digital Versatile Disc, and the like. The computer-readable and computer-executable instructions, which may reside on computer readable media, are used to control or operate in conjunction with, for example, component information unit 100, component monitor 300, and/or component monitor 1310.

FIG. 15 is a flow diagram 1500 of an example method for monitoring overstress conditions experienced by a crane component, in accordance with an embodiment. The method of flow diagram 1500 will be described with reference to above provided examples and with reference to an example implementation described in conjunction with crane component 200, component information unit 100, tower crane 1300, and portions of FIG. 1, FIG. 2, FIG. 13, and FIG. 14.

At operation 1510, in one embodiment, a wireless signal is received which is indicative of an overstress condition experienced by a crane of which a crane component constitutes an assembled portion. With reference to FIG. 13 and to previous discussion and examples, in one embodiment, this comprises component information unit 100 receiving a wireless overstress signal from component monitor 1310 via a wireless mesh network communication. Component monitor 1310 has sent the overstress signal in response to determining the occurrence of an overstress condition occurring during a lift of load 1350 by tower crane 1300. It is appreciated that in one embodiment, the wireless overstress signal is received at component information unit 100 via mesh network device 110. Component information unit 100 is mechanically coupled with crane component 200 and includes mesh network device 110.

In one embodiment, the received overstress signal comprises a descriptor of the overstress condition which is sent in conjunction with the signal. Some examples of descriptors include: a timestamp associated with the occurrence of the overstress condition; an indication that a time-fence was violated; a location associated with the occurrence of the overstress condition; an indication that a geo-fence was violated; a deflection associated with a portion of a crane in which the component is an assembled portion; machine hours or other time of use associated with a crane or a component; and/or a quantification value which is associated with the overstress condition. It is appreciated that the overstress signal can also include other information such as instructions for component information unit 100 to perform certain actions, such as accessing and/or recording measurements from sensors which are coupled with component information unit 100.

At operation 1520, in one embodiment, in response to receiving the signal, a record of the overstress condition is stored in a storage module mechanically coupled with the crane component. Continuing the previous example, in one embodiment, this comprises component information unit 100 storing a record of an overstress condition in storage module 130 in response to receiving the overstress signal which was sent from component monitor 1310.

In one embodiment, if a descriptor is received in conjunction with the overstress signal, then the descriptor or a representation thereof is stored as part of the overstress record. In one embodiment, a timestamp is stored as a portion of the overstress record. The stored timestamp can be a locally generated timestamp, a timestamp accessed from an external entity, or a timestamp received as a descriptor.

In one embodiment, component information unit 100 accesses a measurement of a sensor, such as temperature sensor 141 and/or strain gauge 143, which is coupled with crane component 200. This sensor accessing can be a predefined response to receiving an overstress signal or based upon an instruction received in an overstress signal. In one embodiment, component information unit 100 stores a representation of the accessed measurement (e.g., a temperature measurement) as a portion of the overstress record.

In one embodiment, component information unit 100 wirelessly accesses a location of crane component 200 relative to occurrence of the overstress condition (e.g., an approximate latitude and longitude of crane component 200 when the overstress occurred). This can comprise receiving or requesting a location from GNSS receiver 320 of component monitor 1310, or wirelessly accessing the location of crane component 200 in another manner (examples of which are described herein). Component information unit 100 then stores the accessed location in storage module 130 as a portion of the overstress record. In one embodiment, such a location can be accessed and roughly determined by accessing the location of another component or components and measuring the time of transmission of a signal(s) received from the other component(s). For example triangulation can be used, or the position supplied by one of these components can be used if the time of flight is short enough to indicate that the other component is relatively close (e.g., within 20 meters).

At operation 1530, in one embodiment, information from the record is provided via a wireless communication to facilitate monitoring of occurrence of overstress conditions experienced by the crane component. Continuing the previous example, in one embodiment, this comprises component information unit 100 outputting information from or providing access to information which is stored within the overstress record maintained in storage module 130. This can include providing some or all of the information stored in the overstress record.

In one embodiment, in response to a wireless mesh network access initiated during an inspection of crane component 200, component information unit 100 provides an indication that an overstress condition has occurred with crane component 200. This can be an inspection performed as part of a routine or maintenance inspection or an inspection performed by a government official such as a city crane inspector. For example, when an inspector uses a hand-holdable portable component monitor 700, information from the overstress record is provided wirelessly in response to a communication with hand-holdable portable component monitor 700. Such information can be linked with or embedded in the data of digital pictures of a crane or crane component that are taken using a device such as hand-holdable portable component monitor 700. Such information can include an identity of the crane component 200. Such information can also be displayed in a viewable format on display 705.

In one embodiment, in response to an initiation of a wireless mesh network communication during an inventory movement of the crane component 200, component information unit 100 provides an indication that an overstress condition has occurred with crane component 200. This information can be provided automatically or upon request. Providing information in such a manner (for example to a data mule) allows the information from the overstress record to be up-channeled, such as to inventory unit 900 where it can be stored as a portion of an inventory record related to crane component 200. This allows decisions to be made regarding performing maintenance, inspection, or removal from future use of crane component 200.

In one embodiment, a communication is automatically initiated to an entity such as a crane inspector, crane owner, or rental yard operator, such that the entity is automatically notified of an occurrence of an overstress condition and provided with some portion of the information in the overstress record. Some non-limiting examples of such notification include notification via cell phone message, text message, and/or e-mail message. For example, component monitor 300 can initiate such a communication using communication module 350 either automatically in response to an overstress condition which component monitor 300 is aware of or in response to a request for such communication received from a component information unit which has sensed an overstress condition.

FIG. 16 is a flow diagram 1600 of an example method for monitoring overstress conditions at a crane component, in accordance with an embodiment. The method of flow diagram 1600 will be described with reference to above provided examples and with reference to an example implementation described in conjunction with crane component 200, component information unit 100, tower crane 1300, and portions of FIG. 1, FIG. 2, FIG. 13, and FIG. 14.

At operation 1610, in one embodiment, mechanical flexing of a crane component is measured with a strain gauge which is mechanically coupled with a structural element of the crane component. With reference to FIG. 2 and FIG. 13, this can comprise making a measurement with strain gauge 143 which is mechanically coupled with structural element 207. In one embodiment, the flexing or deflection of a collection of components can be measured on a macro level, such as the deflection of an entire jib which is a macro component of which a component such as crane component 200 constitutes an assembled portion. With reference to FIG. 13, such deflection can be measured by using tip position device 1370, as previously described.

At operation 1620, in one embodiment the measurement of the strain gauge is accessed to sense a stress condition experienced by the crane component and determine occurrence of an overstress condition. In one embodiment, this comprises sensor module 140 accessing the measurement of strain gauge 143 and comparing the measurement to a preset threshold. When the measurement exceeds or otherwise violates the preset threshold, sensor module 140 determines from the comparison that an overstress condition is occurring with crane component 200. In one embodiment, the preset threshold can be set at (or some percentage above or below) a stress on structural element 207 which is equated with a maximum lifting capability in which crane component 200 is authorized to participate. In one embodiment, in conjunction with the creation of a time-fence the threshold value may be varied based upon a time and/or date. Similarly, when a temperature envelope is established, the threshold can be varied in accordance with a measure temperature accessed from temperature sensor 141.

In some embodiments the threshold value is alterable by an authorized entity, such as a rental yard employee or an inspector. For example, via wireless communication between a component monitor 300 and component information unit 100, the overstress threshold maintained in component information unit 100 can be altered in conjunction with terms of a rental contract involving crane component 200. This allows setting an overstress threshold in a manner which can implement time-fence or a geo-fence overstress monitoring.

In one embodiment, when the measurement of the strain gauge is near a threshold (e.g. within a predetermined range such as within 10% of a threshold) or exceeds a threshold, a deflection measurement, such as a deflection of a jib, is accessed to determine if an overstress condition is occurring with a macro component of which a smaller component such as crane component 200 constitutes an assembled portion.

At 1630, in one embodiment, a record of the overstress condition is stored in a storage module which is mechanically coupled with the crane component. As component information unit 100 is mechanically coupled with crane component 200, this can comprise storing a record of the overstress condition, or "overstress record," in a portion of storage module 130. As previously described, a variety of information can be stored in conjunction with the overstress record. For example, in one embodiment, a representation of the measurement from strain gauge 143 is stored as a portion of the overstress record. Likewise, in one embodiment, a temperature measurement from temperature sensor 141 is accessed and stored as a portion of the overstress record. In one embodiment, as described herein, a location (e.g., an approximate latitude and longitude) of crane component 200 relative to occurrence of the overstress condition can be accessed wirelessly from an entity outside of component information unit 100. This location can then be stored as a portion of the overstress record. Information regarding violations of a time-fence and/or a geo-fence can also be stored as part of the overstress record. It is appreciated that a variety of other information, many types of which are described herein, may also be included in an overstress record.

In operation 1640, in one embodiment, information from the record is provided via a wireless mesh network communication to facilitate monitoring of occurrence of overstress conditions experienced by the crane component. For example, this comprises component information unit 100 outputting information from or providing access to information which is stored within the overstress record maintained in storage module 130. This can include providing some or all of the information stored in the overstress record. Operation 1640 is performed in the manner as previously described in operation 1530, and in the interest of brevity, reference is made to this previously provided description. In one embodiment, an entity such as a crane inspector, crane owner, or rental yard operator is automatically notified of an occurrence of an overstress condition and provided with some portion of the information in the overstress record. Some non-limiting examples of such notification include notification via cell phone message, text message, and/or e-mail message.

SECTION 4

Automated Recordation of Crane Inspection Activity

Cranes require regular maintenance and inspection in order to be safely, and in many instances legally, operated. Failure to comply with required maintenance and inspections is a prime contributor to the numerous crane collapses, failures, and disasters that occur yearly on construction job sites and at other location where cranes are used. Typically crane inspections are supposed to be performed by an owner/operator of a crane and/or by a government licensed or contracted crane inspector.

In New York City alone, two deadly tower crane collapses occurred in 2008, one in March and one in May. Failure of a weld was looked at as an accident in one of the collapses. At one point investigators were trying to determine whether the part with the possibly failed weld was removed from another construction site after previously being deemed unsafe. In January of 2009, manslaughter charges were filed against a contractor accused of improperly rigging one of the cranes. In June of 2008, a crane inspector in New York City was arrested and charged with taking bribes to allow cranes to pass inspections. In 2008, yet another New York City crane inspector was accused of lying about examining a construction crane that later collapsed, killing seven people.

Given the ongoing occurrence of these inspection shortcoming and component failure related crane accidents and the continuance of inspection procedures which can be forged and/or pencil-whipped inspections which are not actually accomplished, the embodiments of the present application would not have been obvious to one of skill in the art at the time of this invention. The evident ability and propensity of human inspectors to forge the results of manual crane inspections, to say inspections were accomplished even when they were not performed, and to take bribes to say cranes have passed inspection (even in this age of technology) point to a long felt but unresolved need to automate the inspection process to prevent/reduce the ability for humans to forge inspection results and lie about accomplishing inspections when they may not have even been at or near the site of a crane. Further, the crane accidents and criminal charges against crane contractors and crane inspectors also point to a long felt and unresolved need to positively authenticate and document the time and location of the occurrence of a crane inspection activity. Further still, the evident ease with which as failed crane component can be swapped to another location and continued to be used point to a long felt and unresolved need to automatically and positively tie an inspection of a crane/component to the results of an inspection in a way that can be easily tracked so that a failed component cannot be placed in use elsewhere after it has failed an inspection.

Apparatus for Automated Recordation of Crane Inspection Activity

Figure 17:
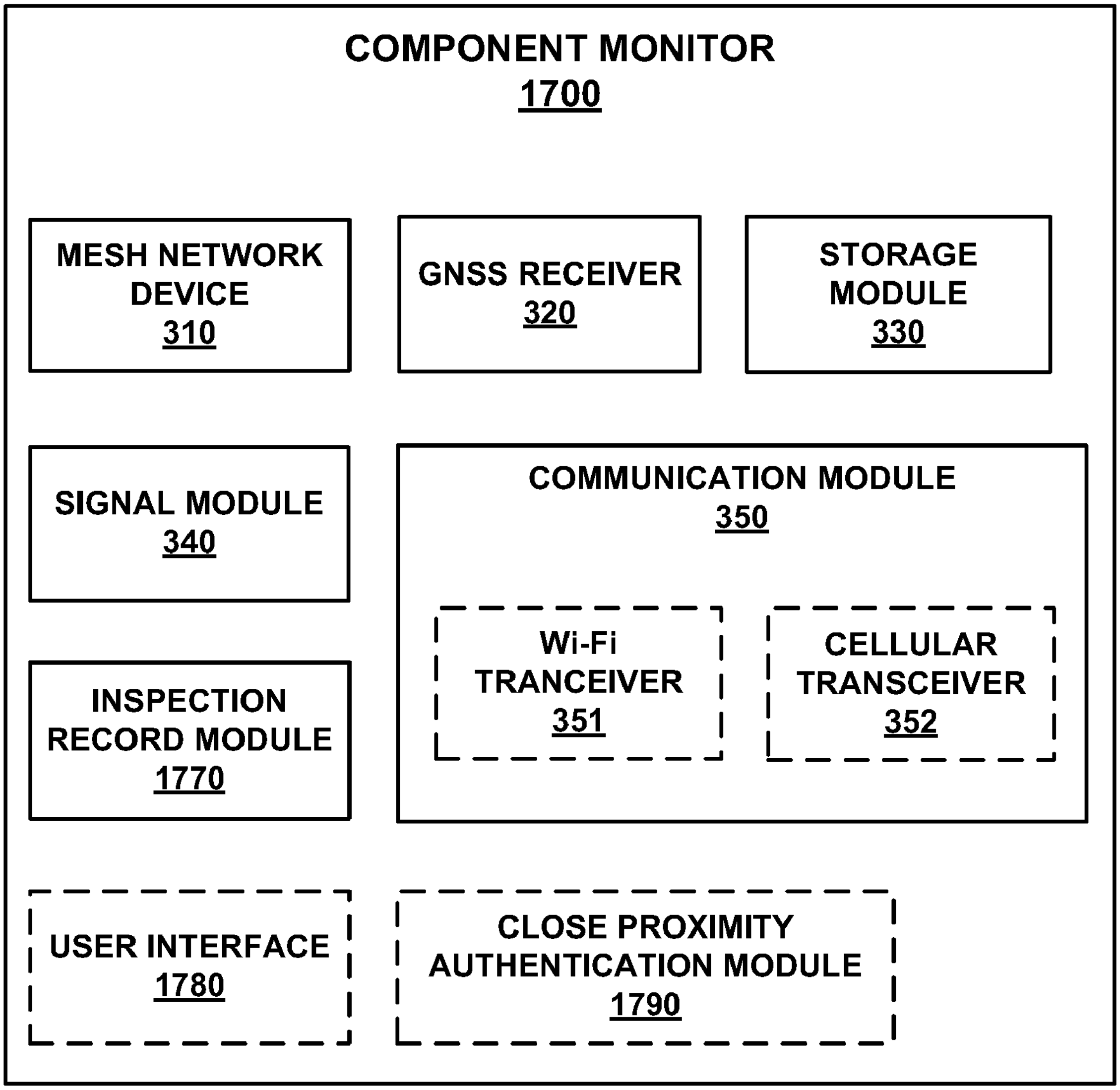
FIG. 17 is a block diagram of an example component monitor used in automated recordation of crane component inspection activity, in accordance with an embodiment.

In various embodiments, a component monitor, such as component monitor 1700, is an apparatus for recording crane inspection activity. As shown in FIG. 17, component monitor 1700 is configured as a crane component inspection monitor and operates to automatically create an electronic record of inspection activity involving a crane or crane component, such as crane 600, crane 1300, or the like and/or a crane component (200, 1330, 1340, or the like) of a crane. In other embodiments, component monitor 1700 is one portion of a system for electronically recording inspection activity of a crane and/or crane component. As an apparatus, component monitor 1700 locally stores record(s) of crane inspection activity. Description of one such apparatus for recording crane component inspection activity is made with reference to FIG. 17, FIG. 3, and the previous description of operation of component monitor 300.

FIG. 17 is a block diagram of an example component monitor 1700 used in automated recordation of crane component inspection activity, in accordance with an embodiment. Like item numbers in FIG. 17 are the same as those of component monitor 300 (FIG. 3), and reference is made to previous description of such items. Component monitor 1700 differs structurally from component monitor 300 in that it includes an inspection record module 1770. In some embodiments, component monitor 1700 also includes one or more of a user interface 1780 and a close proximity authentication module 1790. Functionally, some of the items common between component monitor 300 and component monitor 1700 operate in slightly different or additional ways. To extent that functions of previously described items of component monitor 1700 differ, those additional or differing functions will be described below. In one embodiment, component monitor 1700 is configured within a hand-holdable portable device. One example of such a form factor is illustrated in FIG. 7. This small form factor allows component monitor 1700 to be easily carried in the field such as when climbing on a crane to inspect crane components.

In component monitor 1700, mesh network device 310 automatically engages in a wireless inspection communication with a component information unit 100 via a wireless mesh network. This automatic engagement can occur in response to one of numerous possible inspection activity several triggers or a combination of such triggers and involves sending an inspection communication signal provided by signal module 340. An inspection activity can include simply being in communication range of a component information unit, or can include being in close proximity of a component. Due the relatively short range of a typical mesh network (e.g., a mesh network comprising component monitor 1700 and component information units 100 coupled with components of a crane), an operator of component monitor 1700 would typically be in visual range of the crane components of the mesh network when the component monitor was in communication with the component information units coupled with the components.

For example, in one embodiment, the inspection communication is triggered in response to mesh network device entering a mesh network which includes one or more component information units 100 to which it can communicate. In such an embodiment, mesh network device 310 sends an inspection communication signal to all or some subset of the component information units 100 on the mesh network. In one embodiment, the inspection communication is triggered in response to close proximity authentication module 1790 accessing a close proximity indicator of a component information unit 100 or crane component. In such an embodiment, mesh network device 310 sends an inspection communication signal, via the mesh network, to the component information unit 100 associated with a component that is associated with the close proximity indicator. Further description of a close proximity indicator is provided below in conjunction with description of FIG. 18.

Depending on the number of component information units addressed, the inspection communication is similar to an individually addressed or group addressed roll call signal (previously described) or other polling signal with is addressed to component information units that are coupled with crane components. In response to this inspection communication signal, a receiving component information unit 100 engages in an inspection communication with component monitor 1700 and allows access to a component identification associated with a crane component to which the component information unit is coupled. This access can comprise allowing component monitor 1700 to retrieve the component identification and/or other information from a storage module 130 and or identification module 120 of the component information unit 100. This access can also comprise the component information unit 100 sending the component identification and/or other stored information (such as information from an overstress record) to component monitor 1700. Additionally, as part of this inspection communication, in one embodiment, the component information unit 100 receives and stores (e.g., in a storage module 130) information from component monitor 1700. Such information provided by component monitor 1700 and stored in a component information unit 100 can include a timestamp and/or geostamp that is/are contemporaneous with the inspection communication. This stored information provides a record at the component of the time and/or geographic location of an inspection activity.

In component monitor 1700, GNSS receiver 320 provides a geostamp such as a latitude and longitude that is associated with the occurrence of a wireless inspection communication. In one embodiment, GNSS receiver 320 also provides a timestamp that is associated with the occurrence of a wireless inspection communication. It is appreciated that such a timestamp may also be provided from an internal clock, such as clock included in mesh network device 310.

In component monitor 1700, storage module 330 stores one or more inspection records within component monitor 1700. As described below, in one embodiment, the inspection record is generated and provided to storage module 330 by inspection record module 1770.

In component monitor 1700, communication module 350 operates in the manner previously described and can wirelessly communicate with an inspection record repository unit 1900 (when available) to transfer an inspection record from component monitor 1700 to inspection record repository unit 1900. It is appreciated that an inspection record repository unit 1900 is typically located at a remote location from a construction site or other location of a crane/crane component being inspected. For example, while component monitor 1700 is taken into the field on inspections, inspection record repository unit 1900 may be located in an office that is across a city, across a state, or even further from the location of component monitor 1700. Communication module 350 opens up a wired or wireline communication between component monitor 1700 and inspection record repository unit 1900 so that an inspection record can be sent from component monitor 1700 to inspection record repository unit 1900 for storage or other use at inspection record repository unit 1900. It is appreciated that, via this communication between component monitor 1700 and inspection record repository unit 1900, other information can be exchanged such as work order lists/locations of cranes/crane components to be inspected by the operator of component monitor 1700.

Inspection record module 1770 is communicatively coupled with one or more of the other constituent parts of component monitor 1700, such as via a communication bus. Inspection record module 1770 automatically creates and/or adds information to an inspection record related to a crane component, in response to the wireless inspection communication between component monitor 1700 and a component information unit 100. The inspection record includes a component identification of the component to which the component information unit 100 is coupled. In one embodiment, the inspection record comprises a geostamp to document the geographic location of an inspection activity and/or includes a timestamp to document the date and time of the inspection activity. In some embodiments, inspection record module 1770 also includes, as part of the inspection record, information from an overstress record associated with the crane component. The include overstress information is information that has been accessed from an overstress record (stored in a component information unit 100) as part of the wireless inspection communication.

Table 2, shown by way of example and not of limitation, provides but one example of the information that is included in an inspection record, in one embodiment. It is appreciated that in other embodiments, an inspection record can include a lesser or greater amount of information, depending upon numerous factors including, among others: the type of inspection performed; the type and amount of user input; and the type of information (e.g., overstress record information) accessed from storage in the component information unit 100. As is shown by Table 2, inspection record module 1770 can include a variety of information in an electronic inspection record. Of the information shown in the example of Table 2, inspection record module 1770 can automatically generate and/or populate all of the information except for the inspector comments and the attached digital photograph, both of which are optionally entered via user input. This automated generation and population of the inspection record eases the work-load burden on an inspector or other operator of component monitor 1700, reduces the likelihood of forged inspection records, and provides positive documentation of the time and or location of an inspection activity.

TABLE 2

| Example Information in an Inspection Record |
|---|
| Component Identity: Component_00001340B |
| Inspection Result: Passed Inspection |
| Component Type: Crane Tower Component |
| Crane Type: Tower Crane |
| Component Operating Hours Since Last Inspection: 170 |
| Elapsed Time Since Last Component Inspection: 30 days, 2 Hours, 15 minutes |
| Time of Last Inspection: 11 January 2005/13:00 GMT |
| Timestamp of Current Inspection activity: 10 February 2005/15:15 GMT |
| Geostamp of Current Inspection activity: 36.920054°, −95.293529° |
| Close proximity inspection accomplished: Yes |
| Close proximity inspection identification: |
| Component_00001340B_$$*@@% |
| Inspector Comments: Welds looked good, no signs of rusting or corrosion |
| Photograph: Component_00001340B_10Feb05_1515GMT.jpg |
| Overstress Information, #1 of 1: |
| Type: Mechanical |
| Overstress Timestamp: 30 January 2005/13:10 GMT |
| Location During Overstress: 37.818775°, −121.763725° |
| Temperature During Overstress: 25° Celsius |
| Hours of Component Operation at Overstress: 1,977.20 |

In some embodiments, component monitor 1700 includes one or more user interfaces 1780 for receiving user input, such as notes about the observed condition of the crane component and/or user authenticating information, for inclusion in the inspection record. When included, a user interface 1780 is communicatively coupled with one or more of the other constituent parts of component monitor 1700, such as via a communication bus. It is appreciated that a user interface 1780 can also be used for operating or selecting options in component monitor 1700. The user input can include, for example, one or more of a keyboard, keypad, pushbuttons, touch screen, touch screen, or the like. In some embodiments, component monitor 1700 includes or is coupleable with a digital camera for capturing a digital photograph of a crane or crane component as a user input to be included by inspection record module 1770 in an inspection record. FIG. 7, shows one example of a hand-holdable form factor of a component monitor 1700 which includes a user input 710 such as a keypad, keyboard, pushbuttons, touchpad, touch screen, or other input mechanism for user input and/or for selecting commands, functions, or signals produced or activated. It is appreciated that in other embodiments, component monitor 1700 is implemented in other hand-holdable form factors. One example of another hand-holdable form factor is a cellular telephone that incorporates component monitor 1700.

In some embodiments, component monitor 1700 includes a close proximity authentication module 1790 for accessing a close proximity indication to authenticate a close proximity inspection of a crane component. When included, a close proximity authentication module 1790 is communicatively coupled with one or more of the other constituent items of component monitor 1700, such as via a communication bus. The close proximity indication is accessed from a close proximity indicator that is coupled with or part of component information unit 100 or coupled with the crane component to which component information unit 100 is physically coupled. The close proximity indicator authenticates that an inspector or other operator of component monitor 1700 has been very close to the crane component being inspected. By close proximity, what is meant is approximately 2 meters or less from the location of the of the close proximity indicator.

The close proximity indicator may be one or more of a variety of active, semi-active, or passive devices and/or mechanisms. Some non-limiting examples of close proximity indicators include a bar code or other electro-optically readable code, a passive Radio Frequency Identification Device (RFID) tag, and/or a contact memory device. Some examples of a suitable contact memory device include contact memories such as an iButton® contact memory and/or a One-Wire® contact memory available from Maxim Integrated Products and/or Dallas Semiconductor. It is appreciated that the close proximity indicator at minimum includes identification information such as the component identification that is also stored in component information unit 100. Depending on the type of close proximity indicator utilized, close proximity authentication module 1790 may be an electro-optical scanner (e.g., a bar code reader), an RFID tag reader, a contact memory reader, or the like, or some combination of such devices.

Figure 18:
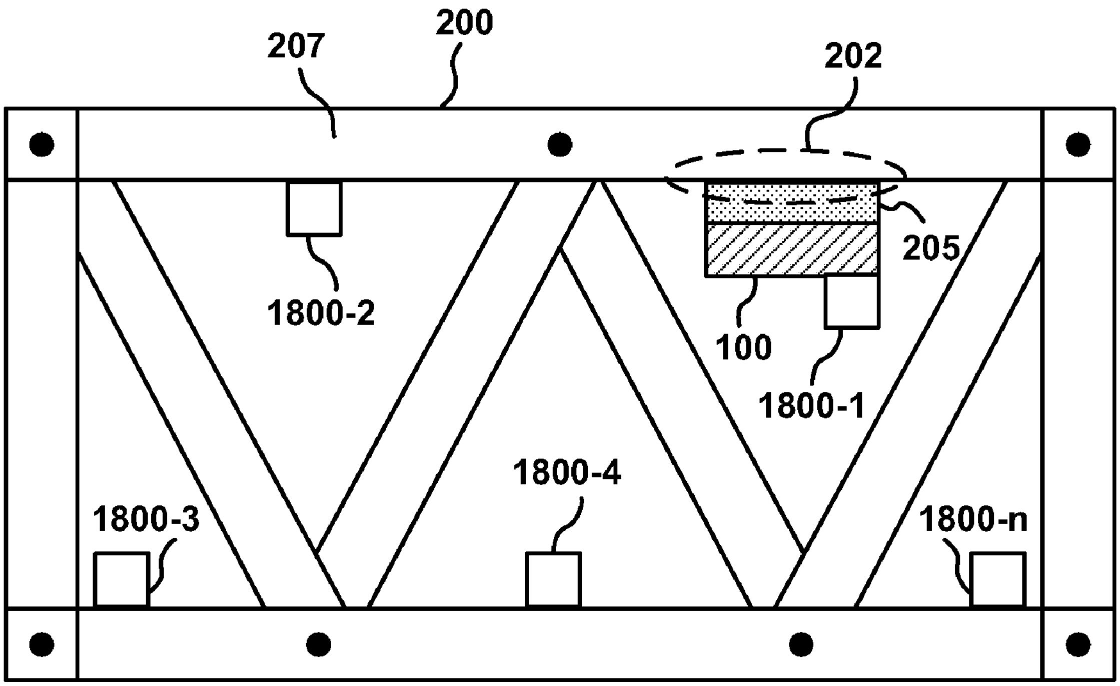
FIG. 18 shows a close proximity indicator coupled with a component information unit and a plurality of close proximity indicators coupled with an example crane component, in accordance with various embodiments.

FIG. 18 shows a close proximity indicator 1800-1 coupled with a component information unit 100 and a plurality of close proximity indicators 1800-2 . . . **1800-*n* coupled with an example crane component 200, in accordance with various embodiments. FIG. 18 shows a crane component 200, which was previously described in FIG. 2, and like item numbers represent like items. As shown in FIG. 18 a close proximity indicator 1800 can be coupled to either a component identification unit 100 (e.g., close proximity indicator 1800-1), a crane component 200 (e.g., close proximity indicator 1800-2), or both. Additionally in some embodiments close proximity indicators 1800 (e.g., 1800-1, 1800-2, 1800-3, 1800-4 . . . 1800-*n***) can be coupled to or coupled near to a vital locations which need to be inspected in order to authenticate that an inspector actually accessed or was in the proximity of these inspectable vital locations of the crane component.

System for Automated Recordation of Crane Inspection Activity

Figure 20:
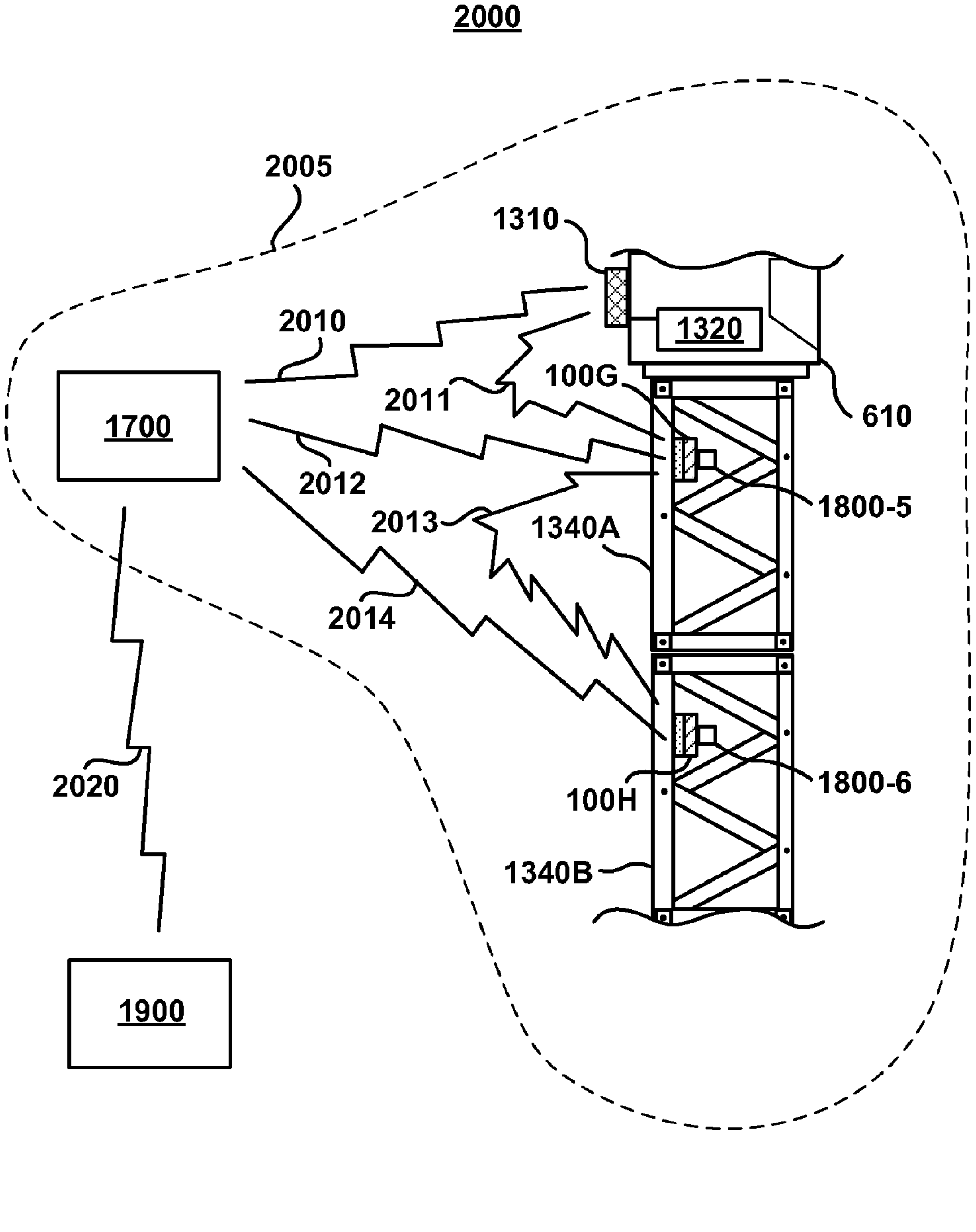
FIG. 20 is block diagram of an example system for electronically recording crane component inspection activity, in accordance with an embodiment.

In some embodiments, component monitor 1700 is a portion of a system for automated recordation of crane inspection activity. An example of one such system (system 2000) is shown in FIG. 20, and includes one or more component information units 100 which are coupled to one or more components of a crane and a component monitor 1700 that can communicate with the component information unit(s). In one embodiment, the system further includes an inspection record repository unit 1900 that can wirelessly receive and store a transmission of an inspection record from component monitor 1700.

Figure 19:
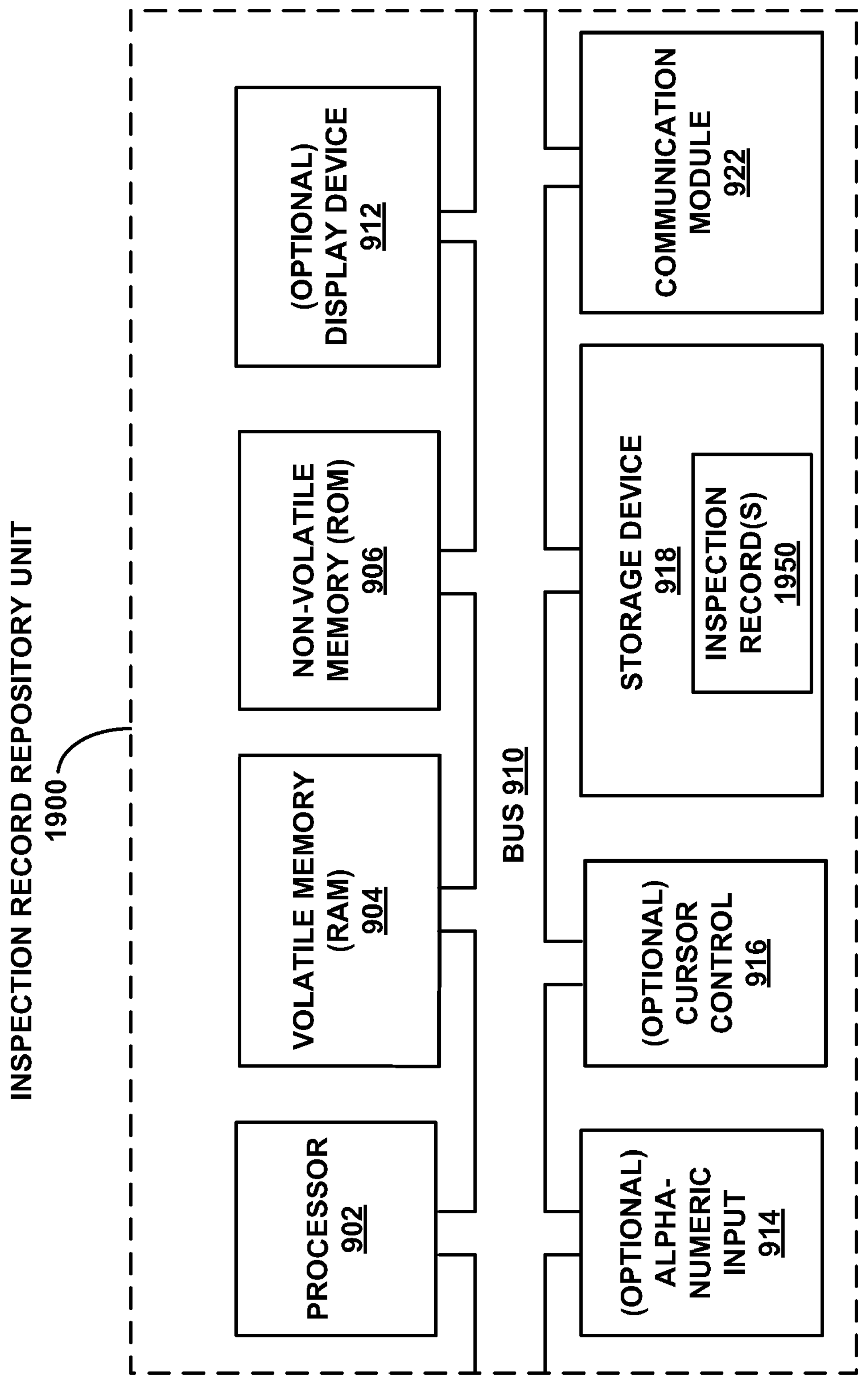
FIG. 19 is a block diagram of an example inspection record repository unit, in accordance with an embodiment.

FIG. 19 is a block diagram of an example inspection record repository unit 1900, in accordance with an embodiment. Inspection record repository unit 1900 is, in one embodiment, similar to inventory unit 900 of FIG. 9. In the interest of brevity and clarity, reference is made to the previous descriptions of like item numbers that are described in conjunction with FIG. 9. Communication module 922 is used in the previously described manner to support wireline and/or wireless communication with component monitor 1700 via communication module 350. Instructions and information, such as previously stored inspection records 1950, can be sent from inspection record repository unit 1900 to component monitor 1700 via such communication. Similarly, one or more inspection records 1950 can be sent from component monitor 1700 to inspection record repository unit 1900 for storage in storage device 1918 (this is similar to the storage of inventory 950 which was previously described in conjunction with FIG. 9). Table 2 provides one example of information that is included in an inspection record 1950 in one embodiment. Inspection record repository unit 1900 can be secure storage that is located at a variety of places, including: at a crane inspector's office; at a crane owner/operator's place of business; at a rental yard that has rented the crane for use; and/or at an insurance company that insures the crane against loss, damage, or collapse.

FIG. 20 is block diagram of an example system 2000 for electronically recording crane component inspection activity, in accordance with an embodiment. System 2000 comprises a component monitor 1700 and at least one component information unit 100 coupled with a crane component. In one embodiment, system 2000 additionally comprises an inspection record repository unit 1900. For clarity of example, a subset of the crane components of crane 1300 (FIG. 13) are illustrated in FIG. 20. It is appreciated that tower crane 1300 is represented by way of example, and not of limitation and that the devices, systems, and methods described herein are operable for inspection and recordation of inspection activity or other types of cranes/crane components. The components illustrated in FIG. 20 are components 1340A, 1340B, and cab 610. Component information unit 100H is mechanically coupled with crane tower component 1340B while component information unit 100G is coupled with crane tower component 1340A. Close proximity indicator 1800-5 is coupled with component information unit 100G while close proximity indicator 1800-6 is coupled with component information unit 100H.

FIG. 20 also illustrates a wireless mesh network 2005 between a plurality of the constituent parts of system 2000. As shown, wireless mesh network 2005 exists in the form of: communications 2013 between component information units 100G and 100H; communications 2011 between component information unit 100G and component monitor 1310; communications 2014 between component information unit 100H and component monitor 1700; communications 2012 between component information unit 100G and component monitor 1700; and communications 2010 between component monitor 1310 and component monitor 1700. It is appreciated that in some embodiments, the wireless mesh network communication between component monitor 1700 and a component information unit 100 can be bridged through component monitor 1310 or another component information unit 100. For example, in one embodiment, component monitor 1700 communicates with component information unit 100H through component information unit 100G (e.g. via communications 2012 and 2013. The mesh network devices (310, 110) of component monitor 1700 and the component information units 100 (100G, 100H) allow the bridged mesh network communications between component monitor 1700 and component information unit 100H to take place on an ad hoc basis as component information unit 100G and component monitor 1700 come into mesh network communication range with one another.

In system 2000, a component information unit 100 has stored within it a component identification that is associated with the crane component to which it is mechanically coupled. Such a component identification has previously been described, and an example of such a component identification is shown in Table 2. With reference to FIG. 20, component monitor 1700 automatically creates and stores an inspection record associated with crane component 1340B in response to occurrence of an inspection activity. Examples of an inspection activity have been previously described. In one embodiment, the inspection activity comprises an inspection communication between component monitor 1700 and component information unit 100H. In one embodiment, the inspection activity comprises an inspection communication between component monitor 1700 and a component information unit 100H and the receipt of a close proximity indication at component monitor 1700 from close proximity indicator 1800-6. In one embodiment, the generated inspection record 1950 includes the component identification associated with crane component 1340B, a geostamp associated with occurrence of the inspection activity, and a timestamp associated with the inspection activity. In one embodiment, inspection record module 1770 generates the inspection record 1950, which is then stored in storage module 330. Using communication module 350, in one embodiment, component monitor 1700 wirelessly transmits the generated inspection record 1950 to a remotely located inspection record repository unit 1900 for remote storage or use. This wireless transmission from component monitor 1700 to inspection record repository unit 1900 is represented in FIG. 20 by wireless communication 2020.

Example Method for Creating a Record of Crane Inspection Activity

Figure 21:
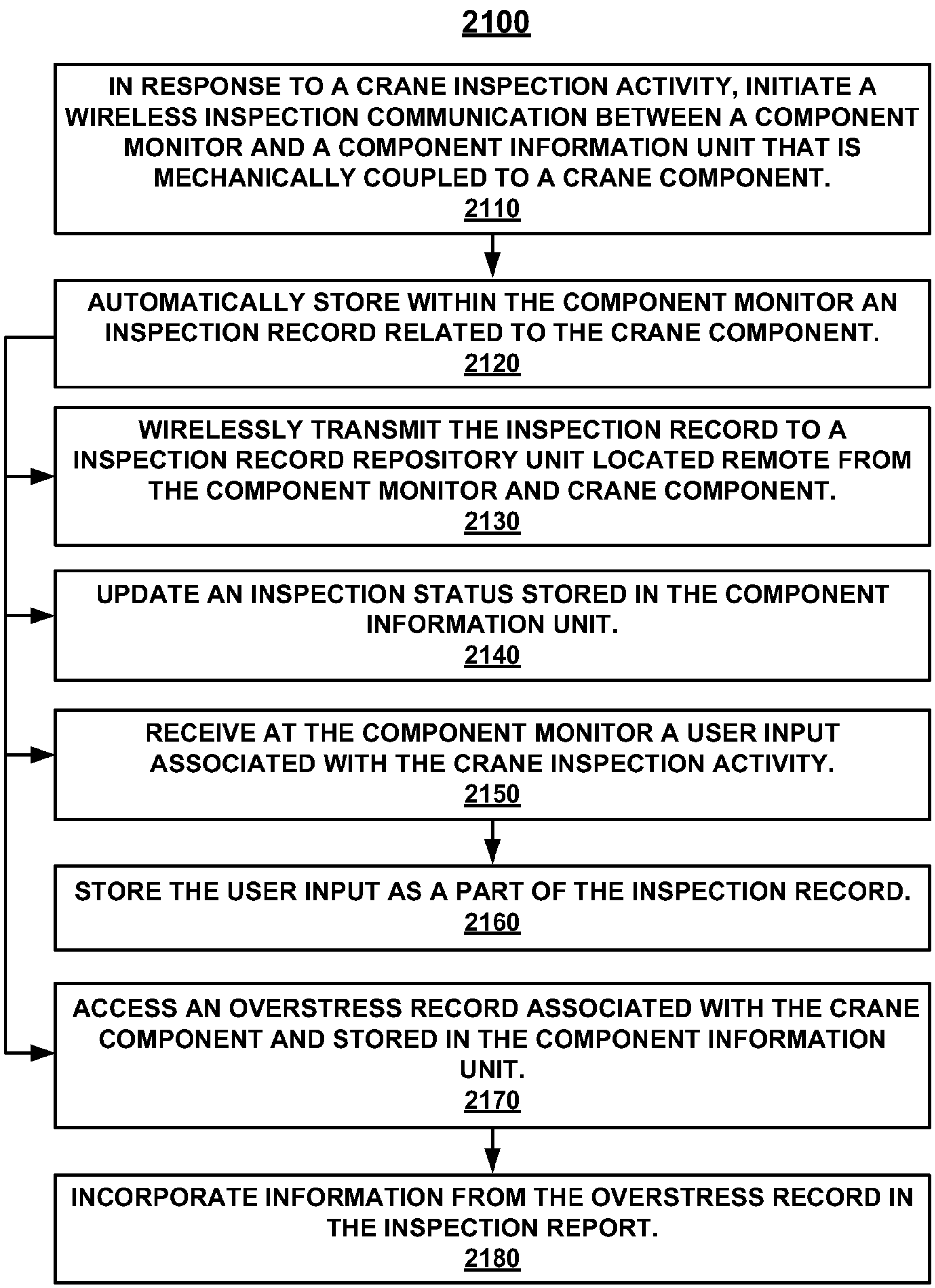
FIG. 21 is a flow diagram of an example method of creating a record of crane inspection activity, in accordance with an embodiment.

With reference to FIG. 21, flow diagram 2100 illustrates example operations and methods used by various embodiments. Flow diagram 2100 includes processes and operations that, in various embodiments, are carried out by a processor under the control of computer-readable and computer-executable instructions. The computer-readable and computer-executable instructions reside, for example, in tangible computer readable media such as volatile memory, non-volatile memory, and/or storage module 330 (FIGS. 3 and 17). The computer-readable and computer-executable instructions can also reside on other tangible computer readable media such as a hard disk drive, floppy disk, magnetic tape, Compact Disc-Read Only Memory (CD-ROM), Digital Versatile Disc (DVD), and the like. The computer-readable and computer-executable instructions, which reside on tangible computer readable media, are used to control or operate in conjunction with, for example, component information unit 100, component monitor 300, and/or component monitor 1700.

FIG. 21 is a flow diagram 2100 of an example method of creating a record of crane inspection activity, in accordance with an embodiment. The method of flow diagram 2100 will be described with reference to above provided examples and with reference to an example implementation described in conjunction with a crane component 1340B, a component information unit 100H, tower crane 1300 (as illustrated partially in FIG. 20), and portions of FIG. 1, FIG. 17, FIG. 18, FIG. 19, and system 2000 of FIG. 20.

At operation 2110, in one embodiment, in response to a crane inspection activity, a wireless inspection communication is initiated between a component monitor and a component information unit that is mechanically coupled with a crane component. In one embodiment, the initiation of the inspection communication comprises automatically initiating the inspection communication from a component monitor in response to the component monitor entering into a mesh network that includes the component information unit. In one embodiment, the initiation of the inspection communication comprises automatically initiating the inspection communication from the component monitor in response to the component monitor receiving a close proximity inspection indication as an input.

In one embodiment, operation 2110 comprises signal module 340 of component monitor 1700 initiating the inspection communication between component monitor 1700 and a component information unit 100. With reference to FIG. 20, this is represented by component monitor 1700 initiating an inspection communication with component information unit 100H (shown coupled to crane component 1340B). In one embodiment, the inspection communication is a wireless mesh network communication which takes place over a wireless mesh network, such as, for example, wireless mesh network 2005. Thus the inspection communication can be directly between component monitor 1700 and component information unit 100H (e.g., communication 2014) or can be bridged through one or more other component information units and/or component monitors in mesh network 2005.

At operation 2120, in one embodiment, an inspection record related to the crane component is automatically stored within the component monitor. In one embodiment, this stored inspection record includes a geostamp and/or a timestamp associated with the inspection communication. The geostamp and timestamp are stored in the inspection record (e.g., inspection record 1950) in conjunction with a component identification that is associated the crane component and that is received from the component information unit as part of the wireless inspection communication. In one embodiment, operation 2120 comprises inspection record module 1770 generating an inspection record 1950 that includes some or all of the information described in Table 2 and storing the inspection record 1950 in storage module 330 of component monitor 1700. The included geostamp and/or timestamp confirm the location and/or time of the inspection activity.

In one embodiment, the automatically generated and stored inspection record 1950 also comprises a stored representation of a close proximity inspection indication that is received at component monitor 1700 (such as by close proximity authentication module 1790) in response to component monitor 1700 accessing a close proximity indication from a close proximity indicator 1800 (e.g., 1800-6) that is coupled with and associated with the crane component (e.g. crane component 1340B) or the component information unit 100 that is coupled with the crane component (e.g. component information unit 100H). As previously described, in one embodiment, a close proximity indicator 1800 can comprise one or some combination of a bar code or other scannable optical code, a passive RFID, and a touch memory button. Such proximity authenticating features can be located at vital locations of the crane component, such as failure prone or fragile locations that require in-person visual inspection. In order for a component monitor to access the close proximity inspection indication (which can comprise information stored in a barcode, RFID, memory button, or the like), component monitor 1790 has to be brought into close proximity (e.g., approximately two meters or less) in order to scan, read or physically touch the close proximity indicator 1800. Thus, the inclusion in an inspection record 1950 of a stored representation of a close proximity inspection indication authenticates that an inspector or other user of component monitor 1700 has gotten close enough to a component or portion of a component that a detailed visual inspection can be accomplished.

At operation 2130, in one embodiment, an inspection record 1950 is wirelessly transmitted from component monitor 1700 to an inspection record repository unit 1900 located remote from component monitor 1700 and the crane component (e.g., crane component 1340B) that is described in the inspection record 1950. This inspection record 1950 is then stored, processed, or used at inspection record repository unit 1900. With reference to FIG. 20, communication 2020 represents a wireless transmission of an inspection record 1950 (regarding crane component 1340B) from component monitor 1700 to inspection record repository unit 1900. In one embodiment, such a transmission occurs automatically such as at intervals or based upon the availability of a wireless communication 2020 between component monitor 1700 and inspection record repository unit 1900. In one embodiment, such a transmission is initiated in response to a user input via user interface 1780.

At operation 2140, in one embodiment, the method further comprises updating an inspection status stored in the component information unit (e.g., component information unit 100H) to reflect a time of the time stamp and a location of the geostamp. In this manner, a follow-on inspection communication can determine a time and place of a previous inspection. It appreciated that this update of inspection status can occur as part of the inspection communication or via other communication between the component monitor 1700 and the component information unit 100 that is being updated. In one embodiment, GNSS receiver 320 provides the geostamp. In one embodiment, GNSS receiver 320 or a clock (such as a clock within mesh network device 310) provides the timestamp. Storage of such information (e.g., in storage module 130 of a component information unit 100) allows after-the-fact determinations of inspection frequency or recency for purposes including accident investigations involving a crane component, inspection compliance auditing involving a crane component, and subsequent inspection of the crane component. In one embodiment, updating the inspection status also comprises including information from the inspection record such as inspector comments and/or a result of the inspection of the crane component (e.g., "pass," "fail," or other result) in the updated inspection status stored in the component information unit that is affixed to the inspected crane component.

At operation 2150, in one embodiment, the component monitor receives a user input associated with the crane inspection activity, this user input can be information such as a condition of a crane component that was visually noted by the user during the inspection activity. A statement such as "severe paint chipping and corrosion are noted," is one example of a user input that might be received in one embodiment. In one embodiment, the user input is received via user interface 1780. In one embodiment, such as when a close proximity inspection indication is received by close proximity authentication module 1790, inspection record module 1770 prompts for a user input such as on a display 705. An example of such a prompt, according to one embodiment, is, "Are there any signs of corrosion on this crane component." In one embodiment, this is answered by pushing one button on a user interface 1780 to indicate a "yes" answer or another button to indicate a "no" answer. A variety of user inputs and user narrative responses can be automatically prompted in this manner. In some embodiments, the user input that is prompted for may comprise an authenticating input, such as the entry of a user's employee identification, password, or a code to authenticate which user/operator of component monitor 1700 is performing an inspection activity on a crane component.

At operation 2160, in one embodiment, the received user input is stored as a part of the inspection record. In one embodiment, this comprises user interface 1780 providing the user input to inspection record module 1770 for inclusion in the inspection record 1950 for the crane component and for storage in storage module 330.

At operation 2170, in one embodiment, an overstress record associated with the crane component and stored in the component information unit (which is physically coupled to the crane component) is accessed as part of the inspection communication between component monitor 1700 and a component information unit 100. The information content of an example overstress record is described in Table 1. This can comprise receiving or retrieving all or part of the information in the overstress record.

At operation 2180, in one embodiment, all or part of the information from the overstress record is included as information in the inspection record 1950 that is generated by inspection record module 1770 and stored within component monitor 1700.

Embodiments of the subject matter are thus described. While the subject matter has been described in particular embodiments, it should be appreciated that the subject matter should not be construed as limited by such embodiments, but rather construed according to the following claims.

What is claimed is:

1. A method for creating a record of crane inspection activity, said method comprising:

in response to a crane inspection activity, initiating a wireless inspection communication between a component monitor and a component information unit, wherein said component information unit is mechanically coupled with a crane component; and automatically storing within said component monitor an inspection record related to said crane component, said inspection record including a geostamp and a timestamp associated with said wireless inspection communication, said geostamp and timestamp stored in said inspection record in conjunction with a component identification that is associated said crane component and that is received from said component information unit as part of said wireless inspection communication, wherein said in response to a crane inspection activity, initiating a wireless inspection communication between a component monitor and a component information unit, wherein said component information unit is mechanically coupled with a crane component comprises:

automatically initiating said inspection communication from said component monitor in response to said component monitor entering into a mesh network that includes said component information unit.

2. The method as recited in claim 1, further comprising:

wirelessly transmitting said inspection record to a inspection record repository unit located remote from said component monitor and said crane component.

3. The method as recited in claim 1, further comprising:

updating an inspection status stored in said component information unit to reflect a time of said time stamp and a location of said geostamp.

4. The method as recited in claim 1, further comprising:

receiving at said component monitor a user input associated with said crane inspection activity; and storing said user input as a part of said inspection record.

5. The method as recited in claim 4, wherein said storing said user input as a part of said inspection record comprises:

storing an authenticating input provided by said user to authenticate said inspection activity.

6. The method as recited in claim 4, wherein said storing said user input as a part of said inspection record comprises:

storing an inspection result related to said crane component and input by said user.

7. The method as recited in claim 1, further comprising:

as part of said inspection communication, accessing an overstress record associated with said crane component and stored in said component information unit, and incorporating information from said overstress record in said inspection record.

8. The method as recited in claim 1, wherein said in response to a crane inspection activity, initiating a wireless inspection communication between a component monitor and a component information unit, wherein said component information unit is mechanically coupled with a crane component comprises:

automatically initiating said inspection communication from said component monitor in response to said component monitor receiving a close proximity inspection indication as an input.

9. The method as recited in claim 8, wherein said automatically storing within said component monitor an inspection record related to said crane component further comprises:

storing a representation of said close proximity inspection indication in said inspection record in response to said component monitor accessing a close proximity indication from a close proximity indicator coupled with and associated with said crane component.

* * * * *